US012272878B2

(12) United States Patent
Abdelrahman et al.

(10) Patent No.: US 12,272,878 B2
(45) Date of Patent: Apr. 8, 2025

(54) COMPOSITE ANTENNA ELEMENT DESIGN AND METHOD FOR BEAMWIDTH CONTROL

(71) Applicant: Huawei Technologies Co., Ltd., Shenzhen (CN)

(72) Inventors: Ahmed Hassan Abdelaziz Abdelrahman, Hillsborough, NJ (US); Zhengxiang Ma, Summit, NJ (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 186 days.

(21) Appl. No.: 17/986,236

(22) Filed: Nov. 14, 2022

(65) Prior Publication Data

US 2023/0076440 A1 Mar. 9, 2023

Related U.S. Application Data

(63) Continuation of application No. PCT/US2020/032888, filed on May 14, 2020.

(51) Int. Cl.

| | |
|---|---|
| ***H01Q 21/26*** | (2006.01) |
| ***H01Q 1/24*** | (2006.01) |
| ***H01Q 1/48*** | (2006.01) |
| ***H01Q 3/34*** | (2006.01) |
| ***H01Q 9/28*** | (2006.01) |
| ***H01Q 19/10*** | (2006.01) |

(52) U.S. Cl.

CPC ............. *H01Q 21/26* (2013.01); *H01Q 1/246* (2013.01); *H01Q 1/48* (2013.01); *H01Q 3/34* (2013.01); *H01Q 9/28* (2013.01); *H01Q 19/108* (2013.01)

(58) Field of Classification Search

CPC .......... H01Q 21/26; H01Q 1/246; H01Q 1/48; H01Q 3/34; H01Q 9/28; H01Q 19/108; H01Q 21/12; H01Q 3/26; H01Q 21/29

See application file for complete search history.

(56) References Cited

U.S. PATENT DOCUMENTS 6,639,558 B2 * 10/2003 Kellerman ............. H01Q 21/28 343/846
7,489,280 B2 * 2/2009 Aminzadeh .......... H01Q 9/0407 343/846
7,498,989 B1 * 3/2009 Volman ................ H01Q 25/001 343/846

(Continued)

FOREIGN PATENT DOCUMENTS

JP 2017224968 A 12/2017

*Primary Examiner* — Seung H Lee
(74) *Attorney, Agent, or Firm* — Slater Matsil, LLP

(57) ABSTRACT

An antenna system includes a composite antenna including a first antenna element disposed above a ground plane, the first antenna element being operatively coupled to a first signal source providing a first signal, the first antenna element being configured to radiate the first signal provided by the first signal source; and a second antenna element disposed above the first antenna element, the second antenna element being operatively coupled to a second signal source providing a second signal, the second antenna element being configured to radiate the second signal provided by the second signal source, the first signal and the second signal being adjusted to set a beamwidth and a directivity of a beam pattern of a combined beam radiated by the composite antenna.

33 Claims, 14 Drawing Sheets

(56) References Cited

U.S. PATENT DOCUMENTS

| | | | | |
|---|---|---|---|---|
| 8,493,278 | B2 * | 7/2013 | Lopez | H01Q 1/28<br>343/800 |
| 8,604,997 | B1 | 12/2013 | Cencich, Sr. et al. | |
| 8,842,050 | B2 * | 9/2014 | Livneh | H01Q 21/293<br>343/702 |
| 2008/0068270 | A1 * | 3/2008 | Thiam | H01Q 21/30<br>343/700 MS |

* cited by examiner

540

560

740

760

940

960

1140

1160

COMPOSITE ANTENNA ELEMENT DESIGN AND METHOD FOR BEAMWIDTH CONTROL

CROSS-REFERENCE TO RELATED APPLICATIONS

This application is a continuation of International Application PCT/US2020/032888, filed May 14, 2020, entitled "Composite Antenna Element Design and Method for Beamwidth Control," which application is incorporated by reference herein in its entirety.

TECHNICAL FIELD

The present disclosure relates generally to antennas, and, in particular embodiments, to composite antenna element design and method for beamwidth control.

BACKGROUND

The shape of beam patterns of communicating devices depends upon the required coverage area. As an example, for access nodes, the shape of the beam patterns may depend upon urban or rural deployments (existence of landscape/building structures and the like) and low-density or high-density coverage, among other considerations. An important factor in the shaping of the beam pattern is the antenna beamwidth.

Factors that have a role in the beamwidth of an antenna array include the design of the antenna elements, the number of antenna elements in the antenna array, the size of sub-arrays, and the element pattern shape. In general, element pattern shape and the size of the sub-arrays are fixed after deployment of the antenna array. Therefore, the antenna beamwidth and directivity are usually controlled by beamforming, as well as activating or deactivating antenna elements.

SUMMARY

According to a first aspect, a composite antenna is provided. In general, a composite antenna element is an antenna element formed from a small number of radiating elements that can be independently driven, but are tightly integrated together either physically or electrically. The composite antenna includes a first antenna element disposed above a ground plane, the first antenna element being operatively coupled to a first signal source providing a first signal, the first antenna element being configured to radiate a first signal provided by the first signal source; and a second antenna element disposed above the first antenna element, the second antenna element being operatively coupled to a second signal source providing a second signal, the second antenna element being configured to radiate a second signal provided by the second signal source, the first signal and the second signal being adjusted to set a beamwidth and a directivity of a beam pattern of a combined beam radiated by the composite antenna element.

In a first implementation form of the method according to the first aspect, the first antenna element comprises a first dual-polarized bowtie antenna arranged in a first plane parallel to the ground plane, and the second antenna element comprises a second dual-polarized bowtie antenna arranged in a second plane parallel to the ground plane, the first plane being positioned between the second plane and the ground plane. In general, a bowtie antenna is a dipole antenna with each arm of the dipole being in the form of an isosceles triangle with its apex oriented towards the center of the dipole antenna. The dipole antenna has the appearance of a bowtie or an hourglass.

In a second implementation form of the method according to the first aspect or any preceding implementation form of the first aspect, the first antenna element is coupled to the first signal source by a first signal feed path. The first signal feed comprises a first support structure comprising two support members, with each support member supporting a bowtie antenna of the first dual-polarized bowtie antenna. A first electrical conductor is disposed within a first support member of the first support structure and is electrically coupled to a first bowtie antenna of the first dual-polarized bowtie antenna and the first signal source. The first electrical conductor is configured to provide the first signal at a first polarity to the first bowtie antenna; and a second electrical conductor disposed within a second support member of the first support structure. The second electrical conductor is coupled to a second bowtie antenna of the first dual-polarized bowtie antenna and the first signal source and is configured to provide the first signal at a second polarity to the second bowtie antenna.

In a third implementation form of the method according to the first aspect or any preceding implementation form of the first aspect, the second antenna element being coupled to the second signal source by a second signal feed path, the second signal feed comprises a second support structure comprising two support members, with each support member supporting a bowtie antenna of the second dual-polarized bowtie antenna. A third electrical conductor is disposed within a third support member of the second support structure, the third electrical conductor being electrically coupled to a first bowtie antenna of the second dual-polarized bowtie antenna and the second signal source and configured to provide the second signal at a first polarity to the first bowtie antenna of the second dual-polarized bowtie antenna. A fourth electrical conductor is disposed within a fourth support member of the second support structure and is electrically coupled to a second bowtie antenna of the second dual-polarized bowtie antenna and the second signal source, the fourth electrical conductor configured to provide the second signal at a second polarity to the second bowtie antenna of the second dual-polarized bowtie antenna.

In a fourth implementation form of the method according to the first aspect or any preceding implementation form of the first aspect, an element is configured to reinforce the first support structure and the second support structure and to electrically couple the first support structure and the second support structure.

In a fifth implementation form of the method according to the first aspect or any preceding implementation form of the first aspect, the first antenna element comprises a first dipole antenna arranged in a first plane parallel to the ground plane. The second antenna element comprises a second dipole antenna arranged in a second plane parallel to the ground plane.

In a sixth implementation form of the method according to the first aspect or any preceding implementation form of the first aspect, the first antenna element is coupled to the first signal source by a first signal feed path including a first electrical conductor electrically coupled to the first dipole antenna. The second antenna element being is to the second signal source by a second signal feed path that includes a second electrical conductor electrically coupled to the second dipole antenna.

In a seventh implementation form of the method according to the first aspect or any preceding implementation form of the first aspect, the first dipole antenna and the second dipole antenna are provided with the same orientation.

In an eighth implementation form of the method according to the first aspect or any preceding implementation form of the first aspect, the first dipole antenna and the second dipole antenna are provided with an offset of less than $\lambda/4$, where $\lambda$ is a wavelength of an intended operating frequency of the composite antenna element.

In a ninth implementation form of the method according to the first aspect or any preceding implementation form of the first aspect, the first antenna element is coupled to the first signal source by a first signal feed path. The first antenna element includes a first bowtie antenna arranged in a first plane parallel to the ground plane. The second antenna element is coupled to the second signal source by a second signal feed path. The second antenna element includes a second bowtie antenna arranged in a second plane parallel to the ground plane.

In a tenth implementation form of the method according to the first aspect or any preceding implementation form of the first aspect, the first signal feed includes a first electrical conductor electrically coupled to the first bowtie antenna. The second signal feed includes a second electrical conductor electrically coupled to the second bowtie antenna.

In an eleventh implementation form of the method according to the first aspect or any preceding implementation form of the first aspect, the first antenna element includes a patch antenna arranged in a first plane parallel to the ground plane. The second antenna element includes a dipole antenna arranged in a second plane parallel to the ground plane.

In a twelfth implementation form of the method according to the first aspect or any preceding implementation form of the first aspect, the first antenna element is coupled to the first signal source by a first signal feed path that includes a first electrical conductor electrically coupled to the patch antenna and the second antenna element being coupled to the second signal source by a second signal feed path that includes a second electrical conductor electrically coupled to the dipole antenna.

In a thirteenth implementation form of the method according to the first aspect or any preceding implementation form of the first aspect, an insulative layer is disposed between the first antenna element and the second antenna element.

In a fourteenth implementation form of the method according to the first aspect or any preceding implementation form of the first aspect, the first signal and the second signal are adjusted to a specified phase difference between the first signal and the second signal.

In a fifteenth implementation form of the method according to the first aspect or any preceding implementation form of the first aspect, the first signal and the second signal are further adjusted to a specified magnitude difference between the first signal and the second signal.

According to a second aspect, an antenna array is presented that includes an array of composite antenna elements as claimed in any one of claims 1-16.

According to a third aspect, a method implemented by a communication device is provided. The method includes determining, by the communication device, a beam pattern for a communication beam; adjusting, by the communication device, weighting factors for a first signal and a second signal of an antenna system with antennas arranged in parallel planes with independent signal feeds, the weighting factors being determined in accordance with the beam pattern; applying, by the communication device, the weighting factors to the first signal and the second signal; and transmitting, by the communication device, the weighted first signal using a first independent signal feed path and the weighted second signal using a second independent signal feed path.

In a first implementation form of the method according to the third aspect, applying the weighting factors comprises multiplying, by the communication device, the first signal with a first weighting factor and multiplying, by the communication device, the second signal with a second weighting factor.

In a second implementation form of the method according to the third aspect or any preceding implementation form of the third aspect, adjusting the weighting factors comprises adjusting a phase difference between the first weighting factor and the second weighting factor to a set value.

In a third implementation form of the method according to the third aspect or any preceding implementation form of the third aspect, adjusting the weighting factors includes adjusting a magnitude difference between the first weighting factor and the second weighting factor a set value.

According to a fourth aspect, a communication device is provided. The communication device includes an array of composite antenna elements, each composite antenna element including a first antenna element disposed above a ground plane. The first antenna element is operatively coupled to a first signal feed and is configured to radiate a first signal provided by the first signal feed. A second antenna element is disposed above the first antenna element and is operatively coupled to a second signal feed. The second antenna element is configured to radiate a second signal provided by the second signal feed, the first signal and the second signal being adjusted to set a beamwidth and a directivity of a beam pattern of a combined beam radiated by the communication device. The device includes non-transitory memory storage including instructions, and one or more processors in communication with the memory storage. Execution of the instructions by the one or more processors causes the device to determine a beam pattern for a communication beam, adjust weighting factors for a first signal and a second signal of an antenna system with antennas arranged in parallel planes with independent signal feeds, determine the weighting factors in accordance with the beam pattern, apply the weighting factors to the first signal and the second signal, and transmit over the array of composite antenna elements the weighted first signal using a first independent signal feed and the weighted second signal using a second independent signal feed.

In a first implementation form of the communication device according to the fourth aspect, the one or more processors execute the instructions to cause the device to multiply the first signal with a first weighting factor and multiply the second signal with a second weighting factor.

In a second implementation form of the communication device according to the fourth aspect or any preceding implementation form of the fourth aspect, the one or more processors execute the instructions to cause the device to adjust a phase difference between the first weighting factor and the second weighting factor to a set value.

In a third implementation form of the communication device according to the fourth aspect or any preceding implementation form of the fourth aspect, the one or more processors execute the instructions to cause the device to adjust a magnitude difference between the first weighting factor and the second weighting factor to a set value.

An advantage of a preferred embodiment is that a composite antenna element with dynamic beamwidth control is provided. The composite antenna element features a small number of antenna elements that are independently fed, and the beamwidth of the antenna pattern of the composite antenna element is controllable by changing the signals being fed to the individual antenna elements.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

The structure and use of disclosed embodiments are discussed in detail below. It should be appreciated, however, that the present disclosure provides many applicable concepts that can be embodied in a wide variety of specific contexts. The specific embodiments discussed are merely illustrative of specific structure and use of embodiments, and do not limit the scope of the disclosure.

Figure 1:
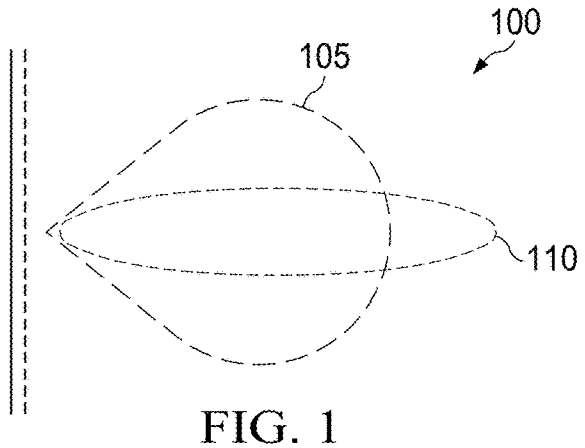
FIG. 1 illustrates example antenna patterns of an antenna array.

FIG. 1 illustrates example antenna patterns 100 of an antenna array. Antenna patterns 100 of the antenna array can range from a wide beamwidth pattern 105 with relatively short reach to a narrow beamwidth pattern 110 with relatively long reach. Given the same amount of transmission power, a wide beamwidth pattern will generally have shorter reach than a narrow beamwidth pattern, but will have wider coverage area.

Figure 2A:
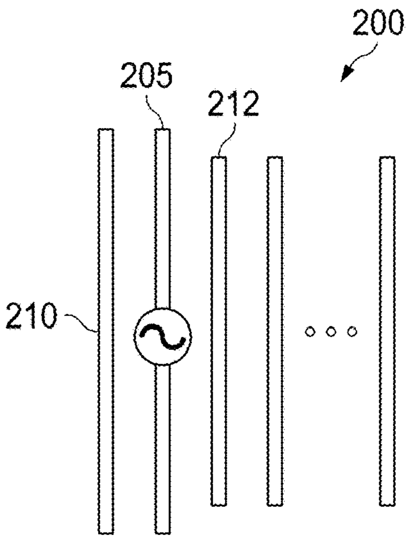
FIG. 2A (PRIOR ART)
FIGS. 2A-2B illustrate prior art antenna elements.

FIG. 2A illustrates a first prior art antenna element 200. Antenna element 200 is commonly referred to as a Yagi-Uda antenna. Antenna element 200 has a single feed at antenna element 205 and multiple other antenna elements, such as antenna element 210 and antenna element 212. Antenna element 210 may be referred to as a reflector, while other antenna elements (such as antenna element 212) are referred to as directors.

Figure 2B:
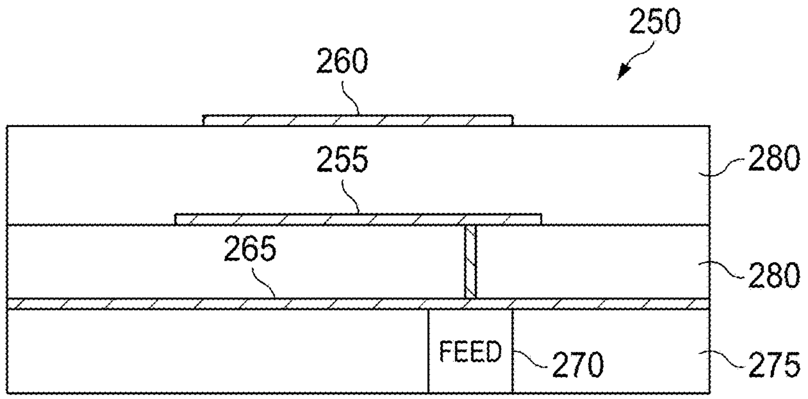
FIG. 2B (PRIOR ART)

FIG. 2B illustrates a second prior art antenna element 250. Antenna element 250 is commonly referred to as a stacked patch antenna. As shown in FIG. 2B, antenna element 250 comprises two patch antennas (patch antenna 255 and patch antenna 260) arranged in a vertical stack above a ground plane 265. Antenna array 250 is fed by a signal feed 270 electrically coupled to patch antenna 255, with patch antenna 260 operating as a director. Ground plane 265 may be disposed on a substrate 275, while patch antennas 255 and 260 may be formed on dielectric layers 280 or open air (with an appropriate support structure in place to maintain orientation and positioning of the antennas of antenna element 250).

The prior art antenna elements shown in FIGS. 2A and 2B have single feeds. Furthermore, the beamwidth of the beam patterns of the prior art antenna elements are generally fixed by the physical dimensions and material properties of the antenna elements. Changing the beam width typically requires arraying multiple such antenna elements into a linear or planer array with multiple feeds, which significantly increases the aperture or area of the total antenna array. The overall increase in the area of the total antenna array may make deployment more difficult in situations where product size is vital, such as communicating devices deployed in space-limited areas.

According to an example embodiment, a composite antenna element with dynamically controllable beamwidth and directivity of the beam pattern is provided. In general, a composite antenna element is an antenna element formed from a small number of radiating elements that can be independently driven, but are tightly integrated together either physically or electrically. The composite antenna element enables the dynamic control of the beamwidth and/or directivity of the beam pattern of the composite antenna element. In an embodiment, the composite antenna element comprises two parallel antenna elements disposed at different heights above a ground plane, with each of the antenna elements being fed with a separate signal. Therefore, each antenna element radiates different individual beam patterns. In an embodiment, the two beam patterns are combined by providing, to the independent signal feeds, signals with controlled relative phases and weighting factors. An overall beam pattern shape of the composite antenna element, with adaptively controlled beamwidth and directivity, results from the combination of the two beam patterns.

Embodiment composite antenna elements offer space savings due to the vertical stacking of the antenna elements. The composite antenna element may be used in antennas for Fifth Generation (5G) beamwidth control applications, such as in access node applications. Embodiment composite antenna element may be particularly attractive in deployments where space is an issue.

According to an example embodiment, an array of composite antenna elements with dynamically controllable beamwidth and directivity of the beam pattern is provided. The array comprises a plurality of composite antenna elements, as presented herein. The array comprises at least two composite antenna elements. The array may be a linear array, a rectangular array, a non-regularly shaped array, etc.

Although the discussion focusses on a composite antenna element with two parallel antenna elements that are independently fed, the example embodiments presented herein are operable with two or more antenna elements. Therefore, the discussion of two parallel antenna elements should not be construed as being limiting to the scope of the example embodiments. Additionally, the composite antenna element is presented as having only antenna elements that are being fed with a signal. The example embodiments are operable with additional antenna elements that are not fed, such as antenna elements operating as reflectors or directors.

Figure 3:
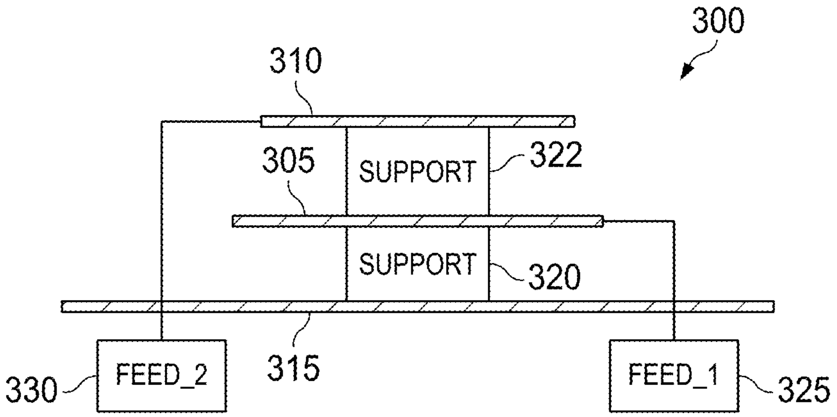
FIG. 3 illustrates a side view of a composite antenna element according to example embodiments presented herein.

FIG. 3 illustrates a side view of a composite antenna element 300. FIG. 3 provides a high-level view of a composite antenna element according to the example embodiments presented herein without providing details regarding the types or configurations of the antenna elements or the feed system for the antenna elements. Details of embodiment antenna element types and configurations, as well as feed systems are provided below.

Composite antenna element 300 includes a first antenna element 305 and a second antenna element 310 arranged in parallel with respect to each other. First antenna element 305 and second antenna element 310 are arranged above a ground plane 315. Supports 320 and 322 maintain the separation and orientation of first antenna element 305, second antenna element 310, and ground plane 315.

In an embodiment, first antenna element 305 and second antenna element 310 may be single polarity antenna elements or dual polarity antenna elements. Alternatively, first antenna element 305 and second antenna element 310 may have different polarity configurations (e.g., first antenna element 305 is a dual polarity antenna element and second antenna element 310 is a single polarity antenna element; or first antenna element 305 is a single polarity antenna element and second antenna element 310 is a dual polarity antenna element).

In an embodiment, each of first antenna element 305 or second antenna element 310 may be any one of a plurality of different antenna element types, such as dipole, bowtie, patch, etc. In general, a bowtie antenna is a dipole antenna with each arm of the dipole being in the form of an isosceles triangle with its apex oriented towards the center of the dipole antenna. The dipole antenna has the appearance of a bowtie or an hourglass. In an embodiment, both first antenna element 305 and second antenna element 310 are of the same antenna element type. In an embodiment, first antenna element 305 and second antenna element 310 are of different antenna element types.

In an embodiment, supports 320 and 322 may be actual structures manufactured to support the antenna elements, such as antenna posts. In an embodiment, supports 320 and 322 may be layers, such as dielectric layers, or some other electrically non-conductive material, fabricated or 3D printed. Supports fabricated or 3D printed from dielectric materials or electrically non-conductive materials are particularly useful in deployments where the composite antenna element is manufactured as a single monolithic unit.

First antenna element 305 is fed by a first signal feed 325 and second antenna element 310 is fed by a second signal feed 330. The signal feeds may be positioned below ground plane 315, as shown in FIG. 3. Alternatively, one or both of the signal feeds may be positioned above the ground plane.

In an embodiment, the signal feeds feed the antenna elements through the supports. In other words, wiring conveying the signals provided by first and second signal feeds 325 and 330 are routed through supports 320 and 322 to their respective antenna elements.

In an embodiment, one of the signal feeds feed one of the antenna elements through the supports. In other words, wiring conveying the signals provided by either first or second signal feeds 325 and 330 is routed through support 320 or 322 to its respective antenna element.

Composite antenna element 300, as shown in FIG. 3, is intended to provide a high-level view of embodiment composite antenna elements. Composite antenna element 300 is not intended to provide a detailed view of any one particular embodiment composite antenna element.

According to an example embodiment, a composite antenna element with dual polarized bowtie antenna elements is provided. The dual polarized bowtie antenna elements are fed with separate signals to enable the dynamic control of the beamwidth and directivity of the beam pattern of the composite antenna element. In an embodiment, each antenna element comprises a dual polarity bowtie antenna element.

Figure 4B:
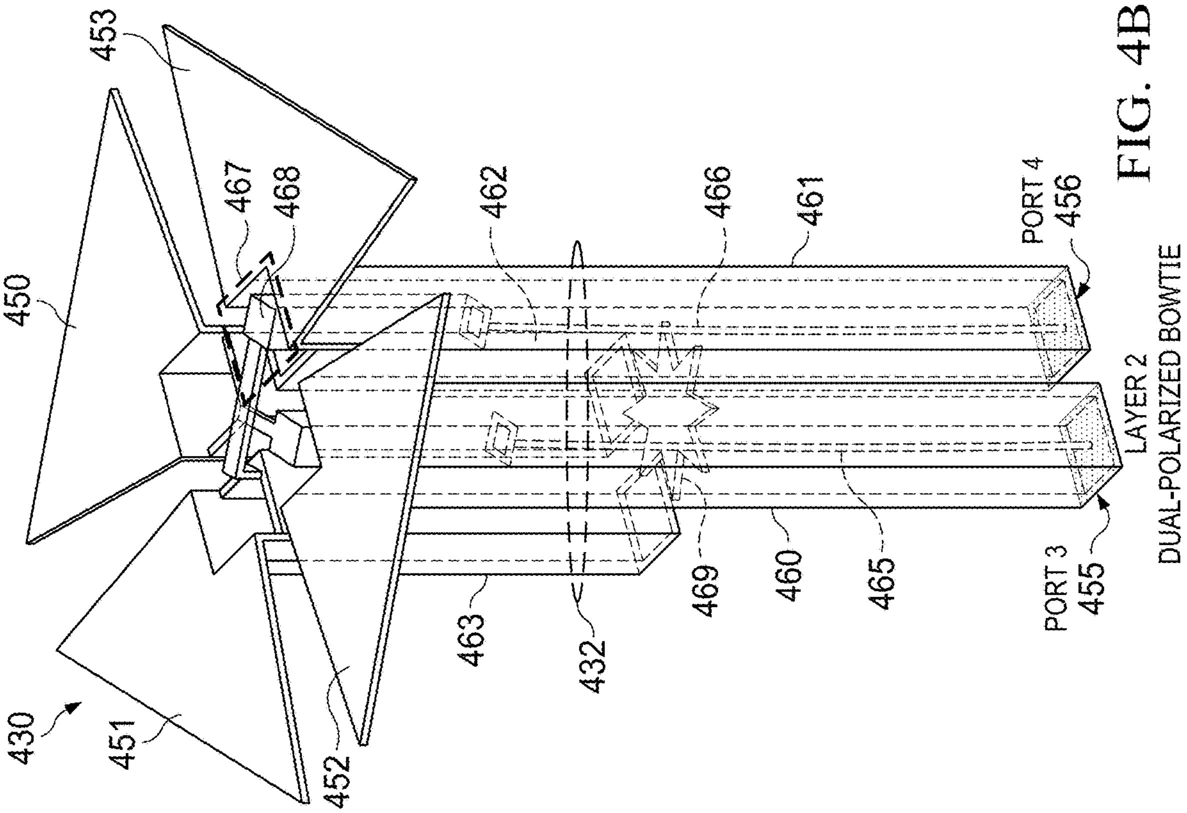
FIG. 4B illustrates a view of a second antenna element of the composite antenna element with dual polarized bowtie antenna elements according to example embodiments presented herein.
Figure 4A:
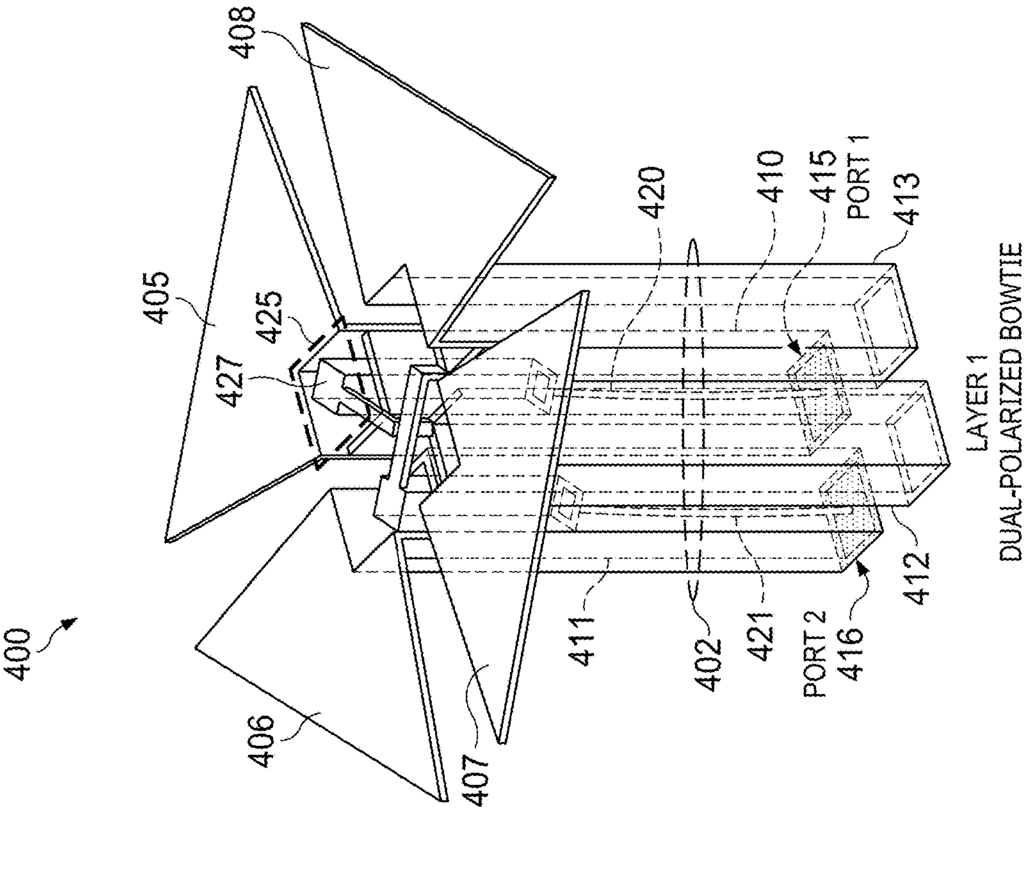
FIG. 4A illustrates a view of a first antenna element of a composite antenna element with dual polarized bowtie antenna elements according to example embodiments presented herein.
Figure 4C:
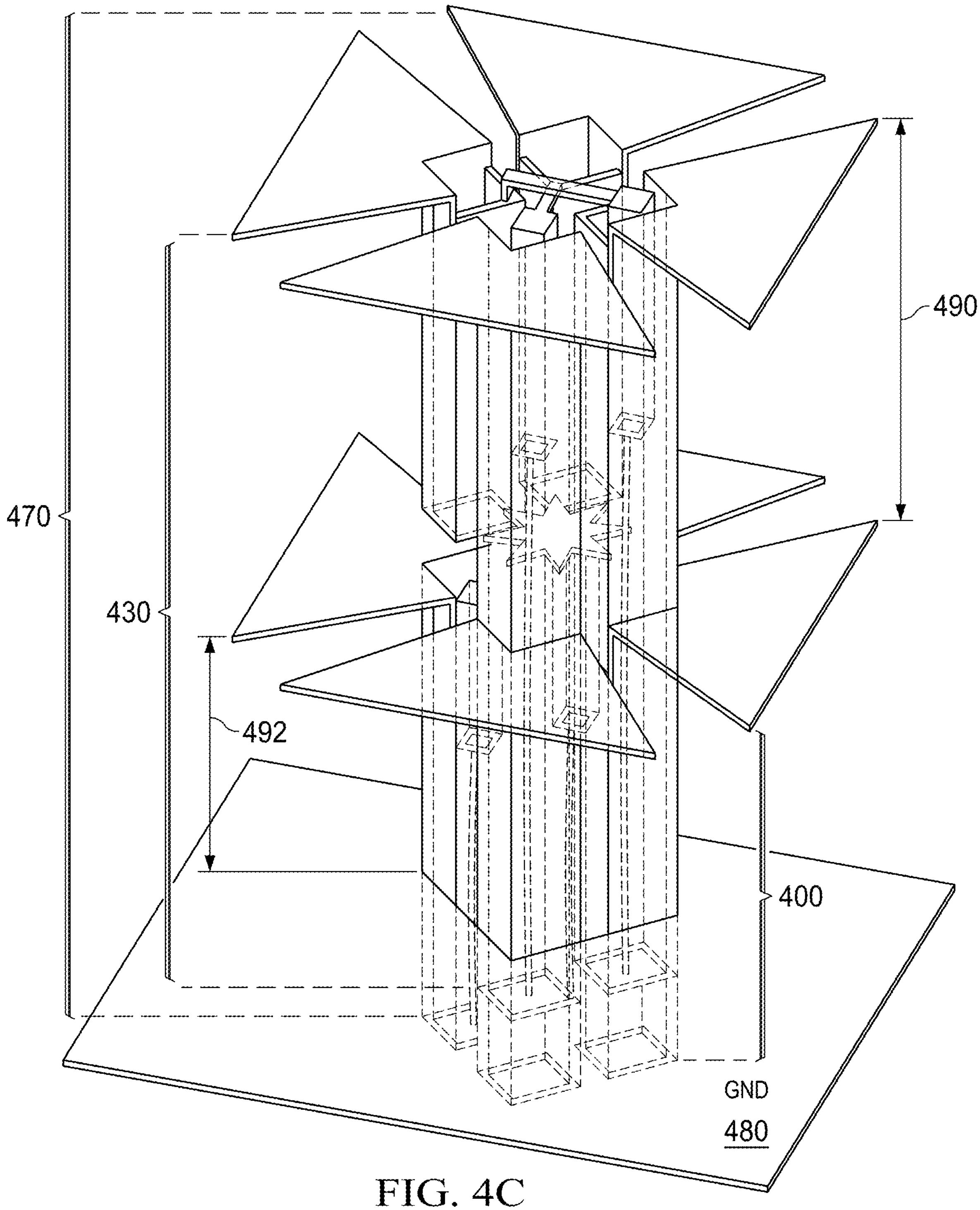
FIG. 4C illustrates a perspective view of the composite antenna element with dual polarized bowtie antenna elements according to example embodiments presented herein.

With reference to FIGS. 4A-4C, there is depicted a view of antenna elements of a composite antenna 470, the antenna elements having dual polarized bowtie antenna elements. The composite antenna 470 is formed from a stacked array of a first antenna element 400 (shown in FIG. 4A) and a second antenna element 430 (shown in FIG. 4B), while FIG. 4C illustrates composite antenna 470. FIG. 4A illustrates first antenna element 400 and a support 402 (comprising posts 410-413) for first antenna element 400. The first antenna element 400 comprises four antenna sub-elements 405, 406, 407, and 408, with opposing antenna sub-elements forming bowties and the two bowties (from the four antenna sub-elements) are of orthogonal polarization. As an example, antenna sub-elements 405 and 407 form a first bowtie and antenna sub-elements 406 and 408 form a second bowtie.

Each antenna sub-element is supported by a post. As an example, antenna sub-element 405 is supported by post 410, antenna sub-element 406 is supported by post 411, antenna sub-element 407 is supported by post 412, and antenna sub-element 408 is supported by post 413. The posts keep the antenna sub-elements separated from a ground plane (480, discussed below in conjunction with FIG. 4C), as well as maintain the relative positions and orientations of the antenna sub-elements.

In an embodiment, posts 410 and 411 are hollow rectangular or square cylinders and conductive wiring is run in the interior (i.e., inside of) the posts. The conductive wiring conveys the signals feeding the antenna elements. As an example, a first signal for a first antenna port 415 is carried in conductive wiring 420 in post 410 and a second signal for a second antenna port 416 is carried in conductive wiring 421 in post 411. In general, antenna ports are openings in the ground plane where the conductive wiring is routed through to provide signals for the antenna elements. However, the signal carried in conductive wiring located within a particular post may not necessarily be intended to feed the antenna sub-element attached to the post. As an example, the first signal carried in conductive wiring 420 in post 410 is shown in FIG. 4A as feeding antenna sub-element 407 rather than antenna sub-element 405 (which is attached to post 410). Similarly, the second signal carried in conductive wiring 421 in post 411 is feeding antenna sub-element 408.

In an embodiment, notches are formed in the hollow square cylinders to allow for the conductive wiring to exit the posts and make electrical contact with respective antenna sub-elements. As an example, notch 425 allows conductive wiring 420 to exit post 410 and make electrical contact with antenna sub-element 407.

In an embodiment, the conductive wiring exiting a post is protected in a contact structure. As example, conductive wiring 420 exiting post 410 is protected in contact structure 427. The contact structure may provide electrical shielding to prevent interference to a signal carried in the conductive wiring, as well as preventing the signal carried in the conductive wiring to cause interference to signals conveyed in nearby conductive wiring.

In an embodiment, posts 412 and 413 are also hollow rectangular or square cylinders. However, posts 412 and 413 are not empty, with posts 460 and 461 (discussed below in conjunction with FIG. 4B) passing through them.

FIG. 4B illustrates a view of a second antenna element 430 of composite antenna 470 with dual polarized bowtie antenna elements. FIG. 4B illustrates second antenna element 430 and a support 432 for second antenna element 430. The second antenna element comprises four antenna sub-elements 450, 451, 452, and 453. Each antenna sub-element is supported by a post. As an example, antenna sub-element 450 is supported by post 462, antenna sub-element 451 is supported by post 463, antenna sub-element 452 is supported by post 460 and antenna sub-element 453 is supported by post 461. The posts keep the antenna sub-elements separated from ground plane (480, discussed below in conjunction with FIG. 4C), as well as maintain the relative positions and orientations of the antenna sub-elements.

However, not all four posts extend all the way to the ground plane. As shown in FIG. 4B, posts 460 and 461 extend to ground plane 480, while posts 462 and 463 do not extend to ground plane 480. Posts 462 and 463 extend down to first antenna element 400 (which is shown in FIG. 4A), but to not make electrical or physical contact with first antenna element 400. As shown in FIG. 4B, a reinforcing structural element 469 provides structural rigidity to composite antenna 470, as well as electrical conductivity among the posts. In other words, conductive structural element 469 mechanically reinforces composite antenna 470, as well as electrically coupling the posts.

In an embodiment, posts 460 and 461 pass through the interior of posts 412 and 413, and down to ground plane 480.

In an embodiment, the posts, such as posts 460 and 461, are hollow rectangular or square cylinders and conductive wiring is run interior to the posts. The conductive wiring conveys the signals feeding the antenna elements. As an example, a third signal for a third antenna port 455 is carried in conductive wiring 465 in post 460 and a fourth signal for a fourth antenna port 456 is carried in conductive wiring 466 in post 461. However, the signal carried in conductive wiring located within a particular post may not necessarily be intended to feed the antenna sub-element attached to the post. As an example, the third signal carried in conductive wiring 465 in post 460 is shown in FIG. 4B as feeding antenna sub-element 450 rather than antenna sub-element 452 (which is attached to post 460). Similarly, the fourth signal carried in conductive wiring 466 in post 461 is feeding antenna sub-element 451.

In an embodiment, notches are formed in the hollow rectangular or square cylinders to allow for the conductive wiring to exit the posts and make electrical contact with respective antenna sub-elements. As an example, notch 467 allows conductive wiring 466 to exit post 461 and make electrical contact with antenna sub-element 451.

In an embodiment, the conductive wiring exiting a post is protected in a contact structure. As example, conductive wiring 466 exiting post 461 is protected in contact structure 468. The contact structure may provide electrical shielding to prevent interference to a signal carried in the conductive wiring, as well as preventing the signal carried in the conductive wiring to cause interference to signals conveyed in nearby conductive wiring.

Although the discussion focuses on the posts being hollow rectangular or square cylinders, the posts may be other shapes, such as triangular, round, oval, pentagonal, hexagonal, as well as other shapes. Therefore, the discussion of rectangular or square cylinders should not be construed as being limiting to the scope of the example embodiments.

FIG. 4C illustrates a perspective view of composite antenna 470. The perspective view of composite antenna 470 also displays ground plane 480. The ports shown in FIGS. 4A and 4B are not shown in FIG. 4C, but the ports penetrate ground plane 480, with wiring running interior of the posts.

An example composite antenna 470 may be configured as follows:

- $\lambda/4$ spacing between the two dual polarized bowtie antenna elements (between antenna sub-elements 405-408 and antenna sub-elements 450-453, shown as spacing 490 in FIG. 4C), e.g., about 25 mm at 3 GHz, where $\lambda$ is the wavelength of the intended operating frequency of the composite antenna element.

~λ/4 spacing between the first dual polarized bowtie antenna element and the ground plane 480 (shown as spacing 492 in FIG. 4C), e.g., about 27 mm at 3 GHz.

50 ohm input impedance at all ports.

In an embodiment, the conductive wiring is external to the posts supporting the antenna sub-elements.

Figure 5A:
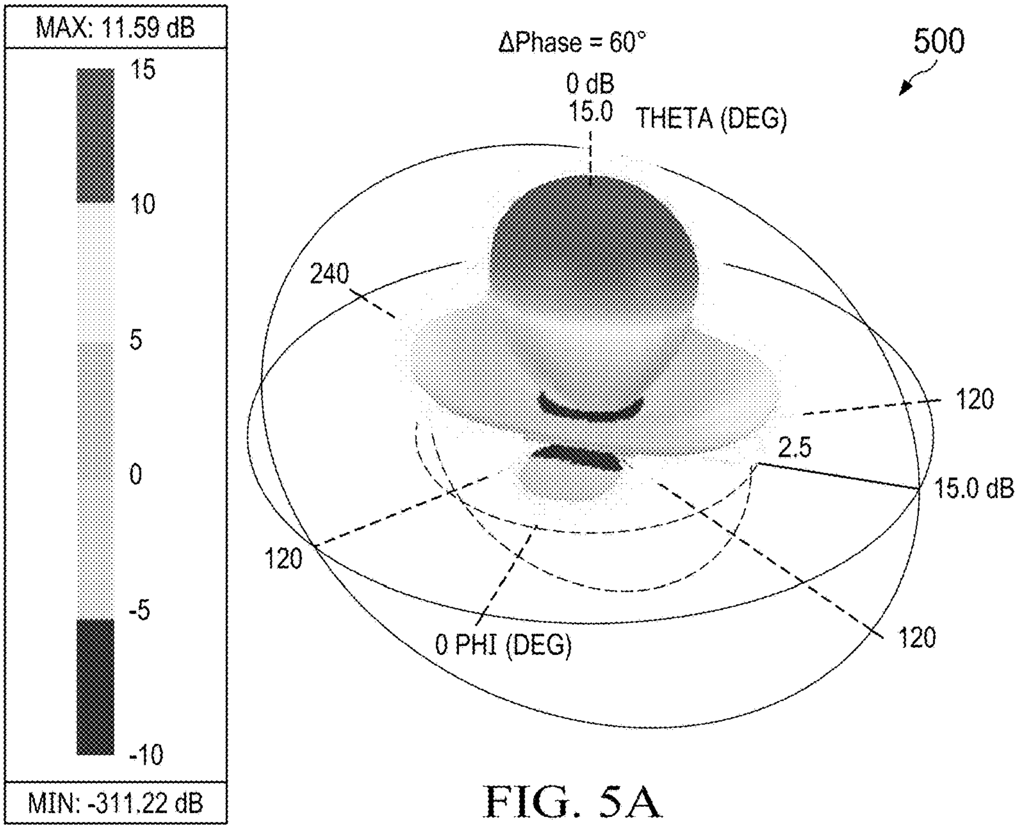
FIGS. 5A-5B illustrate plots of co-polarized directivity or beam pattern of the composite antenna element of FIG. 4C with about 60 and 180 degree relative phase differences between signals according to example embodiments presented herein.
Figure 5B:
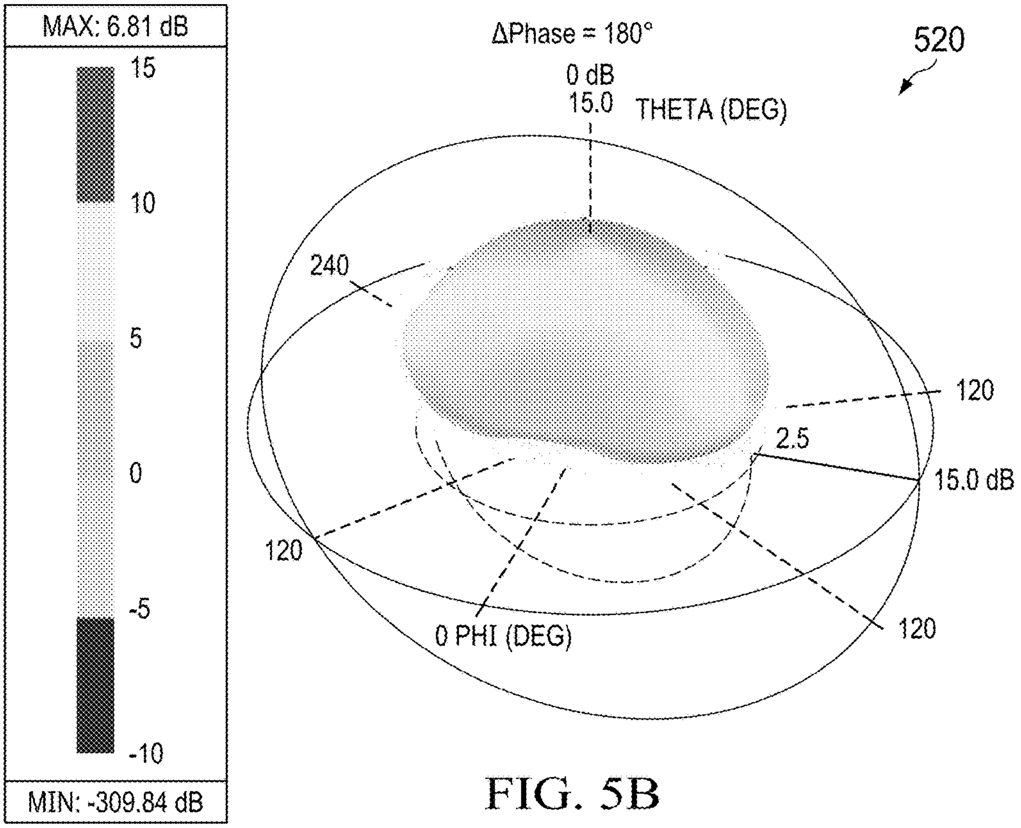

FIG. 5A illustrates a plot 500 of co-polarized directivity or beam pattern of composite antenna 470 with about a 60 degree relative phase difference between signals. Plot 500 displays the co-polarized directivity or beam pattern of composite antenna element 400 with about a 60 degree relative phase difference between signals at the first port and the third port. FIG. 5B illustrates a plot 520 of co-polarized directivity or beam pattern of composite antenna 470 with about a 180 degree relative phase difference between signals. Plot 520 displays the co-polarized directivity or beam pattern of composite antenna 470 with about a 180 degree relative phase difference between signals at the first port and the third port. The co-polarized directivity or beam patterns shown in FIGS. 5A and 5B are shown in dB, with different shading representing different dB value ranges. Differences in maximum and minimum values shown in FIGS. 5A and 5B are due to different antenna beams shown in the figures. Comparing plots 500 and 520, the co-polarized directivity or beam pattern becomes wider with less directivity as the relative phase difference increases to about 180 degrees. Actual values are not as important (because different beams are being shown) as the changes in the beam shapes, which show that the directivity or beam pattern becomes less directional as the relative phase difference increases to about 180 degrees.

Figure 5C:
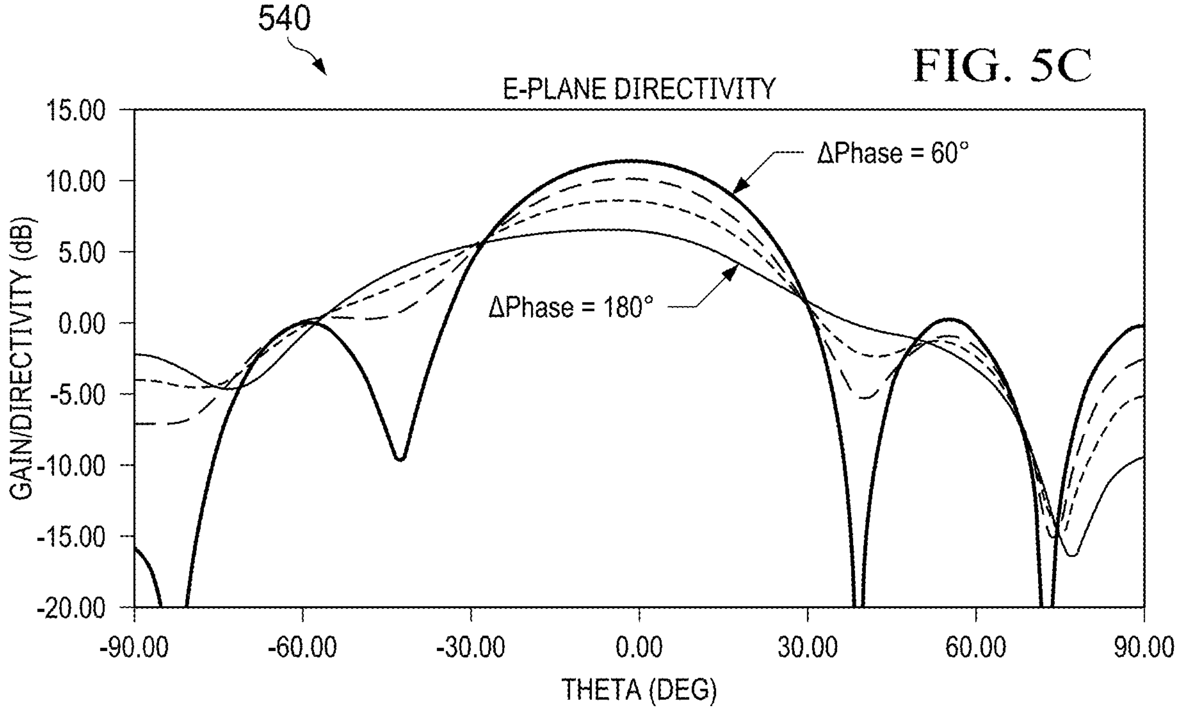
FIGS. 5C-5D illustrate plots of E-plane and H-plane directivity or beam pattern of the composite antenna element of FIG. 4C with different relative phase differences according to example embodiments presented herein.
Figure 5D:
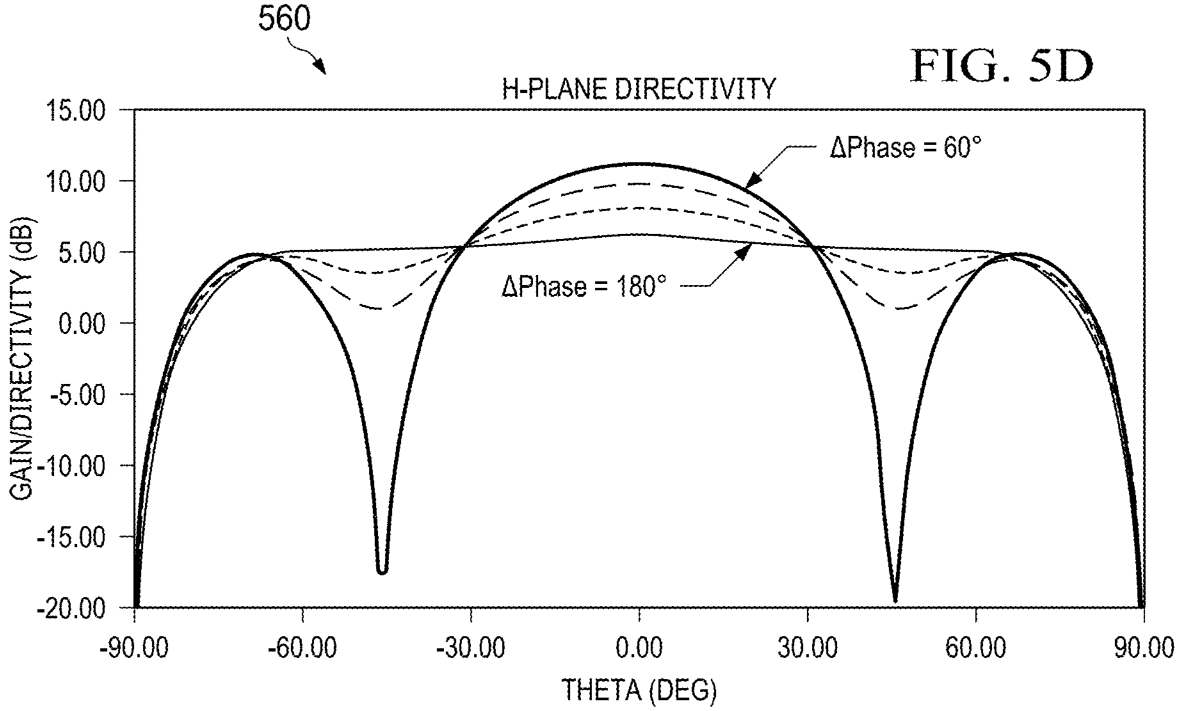

FIG. 5C illustrates a plot 540 of E-plane directivity or beam pattern of composite antenna element 400 with different relative phase differences. The E-plane is the plane that contains the electric field vector and is the direction of maximum radiation. As shown in FIG. 5C, the E-plane directivity or beam pattern flattens out with fewer and less severe valleys as the relative phase difference increases from about 60 degrees to about 180 degrees. FIG. 5D illustrates a plot 560 of H-plane directivity or beam pattern of composite antenna element 400 with different relative phase differences. The H-plane is the plane that contains the magnetic field vector and is the direction of maximum radiation. As shown in FIG. 5D, the H-plane directivity or beam pattern flattens out with fewer and less severe valleys as the relative phase difference increases from about 60 degrees to about 180 degrees. Hence, the beam pattern of composite antenna element 400 becomes wider as the relative phase difference approaches about 180 degrees. The flattening of the E-plane and H-plane directivity or beam pattern means that the beams are becoming less directional as the relative phase difference approaches 180 degrees. Therefore, if a less directional beam is desired, a signal with a relative phase difference close to 180 degrees may be fed to composite antenna 470. While, if a more directional beam is desired, a signal with a relative phase difference close to 60 degrees may be fed to composite antenna 470. Hence, it is possible to control the directivity of composite antenna 470 by changing the relative phase difference of the signals fed to composite antenna 470.

In an embodiment, in order to increase the co-polarized directivity or beamwidth of the beam pattern of composite antenna 470, the relative phase difference between the signals is increased to a maximum of about 180 degrees.

In an embodiment, the adjustment of the signals fed to the composite antenna elements is performed in the digital domain, where both the phase and the magnitudes of the signals may be adjusted. As an example, the phase, the magnitude, or the phase and the magnitude of the signals is adjusted using digital signal processing. In an embodiment, the adjustment of the signal feeds to the composite antenna element is performed in the analog domain, where the phase of the signals may be adjusted. As an example, the phase of the signals is adjusted using phase shifting circuitry.

According to an example embodiment, a composite antenna element with parallel dipole antenna elements is provided. In an embodiment, each antenna element comprises a dipole antenna element. The parallel dipole antenna elements are fed with separate signals to enable the controlling of the beamwidth and directivity of the beam pattern of the composite antenna element. In an embodiment, the parallel dipole antenna elements are parallel to each other. In an embodiment, the dipole antenna elements are offset from each other. In other words, one dipole antenna element is shifted parallel to the ground plane relative to the other dipole antenna element. As an example, the top dipole antenna element is shifted by less than λ/4 from the other dipole antenna element. In an embodiment, the parallel dipole antenna elements have the same physical dimension.

Figure 6:
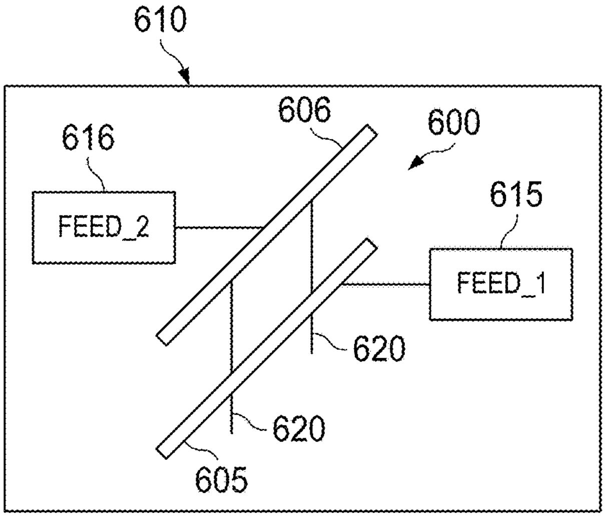
FIG. 6 illustrates a perspective view of a composite antenna element with parallel dipole antenna elements according to example embodiments presented herein.

FIG. 6 illustrates a perspective view of a composite antenna 600 with parallel dipole antenna elements. Composite antenna 600 comprises two parallel dipole antenna elements 605 and 606 disposed over a ground plane 610. The two parallel dipole antenna elements 605 and 606 are fed by signal feeds 615 and 616, respectively. Supports 620 keep the dipole antenna elements separated from ground plane 610, as well as maintain the relative positions and orientations of the dipole antenna elements. In an embodiment, signal feeds 615 and 616 may penetrate (where wiring associated with signal feeds going from one side of the ground plane to the other side of the ground plane) ground plane 610. In an embodiment, signal feeds 615 and 616 are above ground plane 610. In an embodiment, one of signal feeds 615 or 616 is above ground plane 610, while the other signal feed penetrates ground plane 610.

An example composite antenna 600 may be configured as follows:

λ/4 spacing between the two dipole antenna elements, e.g., about 25 mm at 3 GHz.

0.2λ spacing between the first dual dipole antenna element and the ground plane, e.g., about 20 mm at 3 GHz.

26 and 36 ohm input impedance at the two dipole antenna elements, respectively.

Figure 7A:
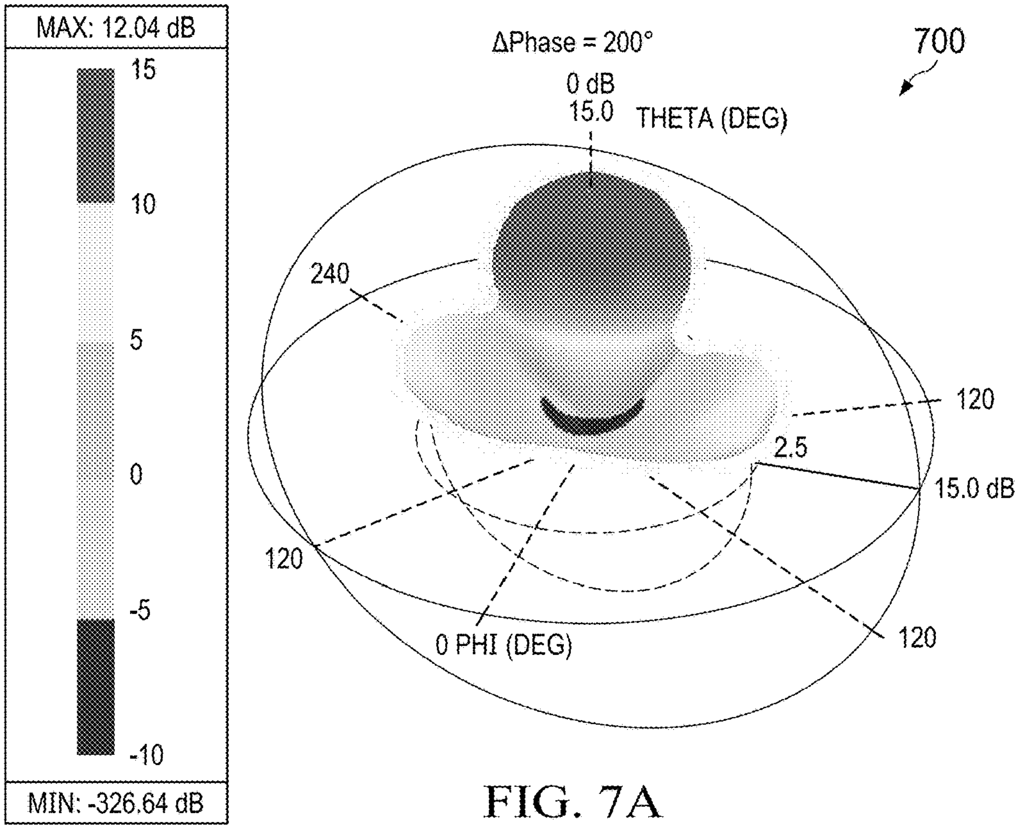
FIGS. 7A-7B illustrate plots of co-polarized directivity or beam pattern of the composite antenna element of FIG. 6 with about 200 and 330 degree relative phase differences between signals according to example embodiments presented herein.
Figure 7B:
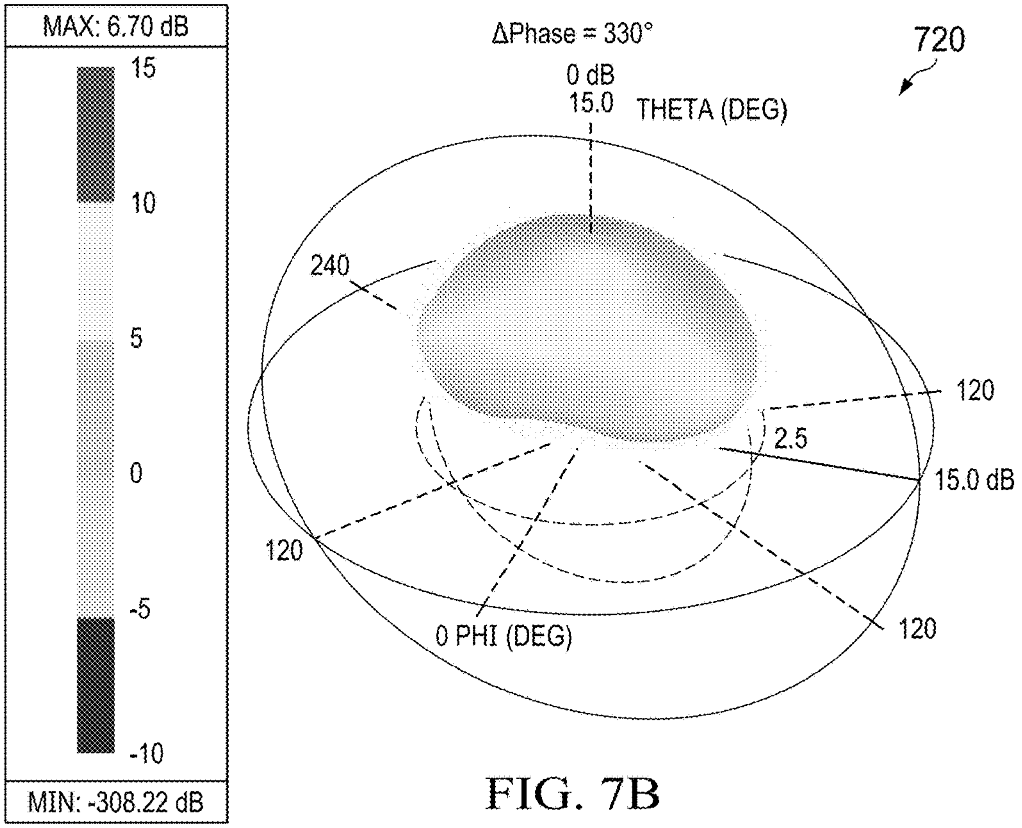

FIG. 7A illustrates a plot 700 of co-polarized directivity or beam pattern of composite antenna 600 with about a 200 degree relative phase difference between signals. Plot 700 displays the co-polarized directivity or beam pattern of composite antenna 600 with about a 200 degree relative phase difference between signals at the two ports. FIG. 7B illustrates a plot 720 of co-polarized directivity or beam pattern of composite antenna 600 with about a 330 degree relative phase difference between signals. Plot 720 displays the co-polarized directivity or beam pattern of composite antenna 600 with about a 330 degree relative phase difference between signals at the two ports. The co-polarized directivity or beam patterns shown in FIGS. 7A and 7B are shown in dB, with different shading representing different dB value ranges. Differences in maximum and minimum values shown in FIGS. 7A and 7B are due to different antenna beams shown in the figures. Comparing plots 700 and 720, the co-polarized directivity or beam pattern becomes wider with less directivity as the relative phase difference increases to about 330 degrees. Actual values are not as important (because different beams are being shown) as the changes in the beam shapes, which show that the directivity or beam pattern becomes less directional as the relative phase difference increases to about 330 degrees.

Figure 7C:
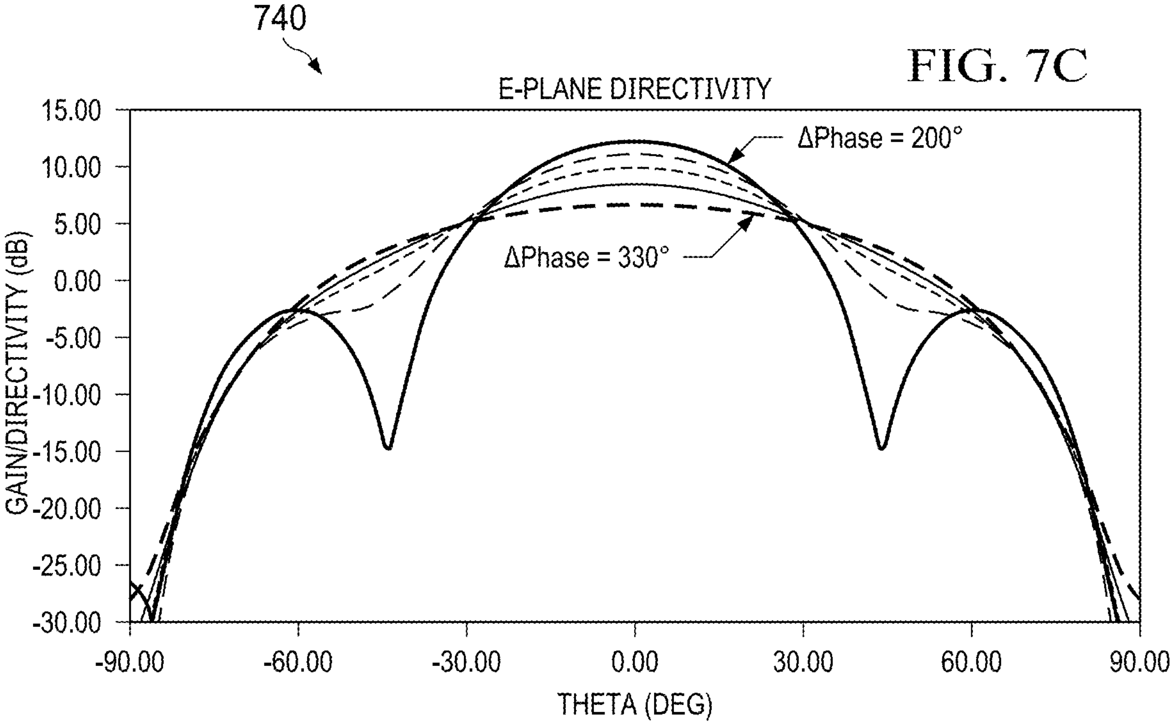
FIGS. 7C-7D illustrate plots of E-plane and H-plane directivity or beam pattern of composite antenna element of FIG. 6 with different relative phase differences according to example embodiments presented herein.
Figure 7D:
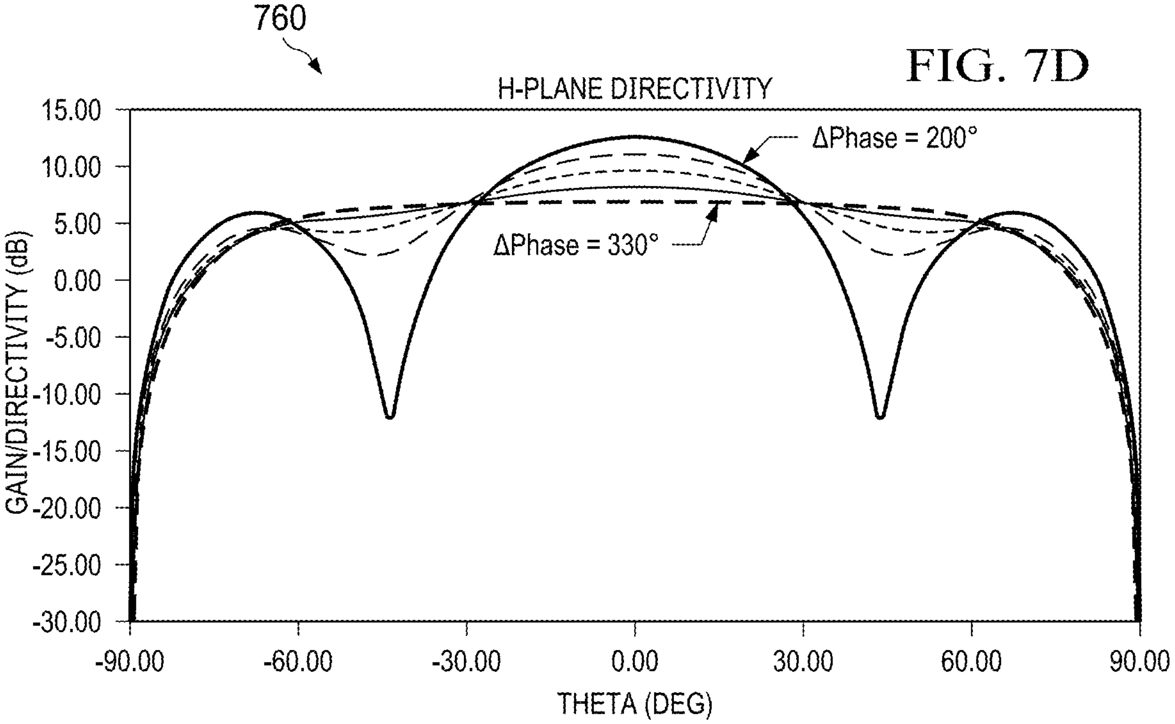

FIG. 7C illustrates a plot 740 of E-plane directivity or beam pattern of composite antenna 600 with different relative phase differences. As shown in FIG. 7C, the E-plane directivity or beam pattern flattens out with fewer and less severe valleys as the relative phase difference increases from about 220 degrees to about 330 degrees. FIG. 7D illustrates a plot 760 of H-plane directivity or beam pattern of composite antenna 600 with different relative phase differences. As shown in FIG. 7D, the H-plane directivity or beam pattern flattens out with fewer and less severe valleys as the relative phase difference increases from about 220 degrees to about 330 degrees. Hence, the co-polarized directivity or beam pattern of composite antenna 600 becomes wider as the relative phase difference approaches about 330 degrees. The flattening of the E-plane and H-plane directivity or beam pattern means that the beams are becoming less directional as the relative phase difference approaches 330 degrees. Therefore, if a less directional beam is desired, a signal with a relative phase difference close to 330 degrees may be fed to composite antenna 600. While, if a more directional beam is desired, a signal with a relative phase difference close to 200 degrees may be fed to composite antenna 600. Hence, it is possible to control the directivity of composite antenna 600 by changing the relative phase difference of the signals fed to composite antenna 600.

In an embodiment, in order to increase the co-polarized directivity or beamwidth of the beam pattern of composite antenna 600, the relative phase difference between the signals is increased to a maximum of about 330 degrees.

According to an example embodiment, a composite antenna element with parallel bowtie antenna elements is provided. In an embodiment, each antenna element comprises a bowtie antenna element. The parallel bowtie antenna elements are fed with separate signals to enable the controlling of the beamwidth and directivity of the beam pattern of the composite antenna element. In an embodiment, the parallel bowtie antenna elements are parallel to each other. In an embodiment, the parallel bowtie antenna elements are offset from each other. In other words, one parallel bowtie antenna element shifted parallel to the ground plane relative to the other parallel bowtie antenna element. As an example, the top parallel bowtie antenna element is shifted by less than λ/4 from the other parallel bowtie antenna element. In an embodiment, the parallel bowtie antenna elements have the same physical dimension.

Figure 8:
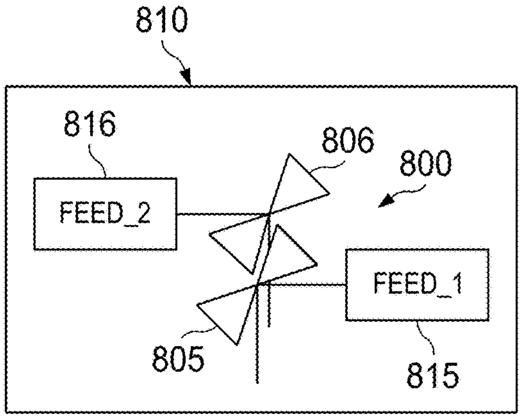
FIG. 8 illustrates a perspective view of a composite antenna element with parallel bowtie antenna elements according to example embodiments presented herein.

FIG. 8 illustrates a perspective view of a composite antenna 800 with parallel bowtie antenna elements. Composite antenna 800 comprises two parallel bowtie antenna elements 805 and 806 disposed over a ground plane 810. The two parallel bowtie antenna elements 805 and 806 are fed by signal feeds 815 and 816, respectively. Support 820 keeps the bowtie antenna elements separated from ground plane 810, as well as maintain the relative positions and orientations of the bowtie antenna elements. In an embodiment, signal feeds 815 and 816 may penetrate ground plane 810. In an embodiment, signal feeds 815 and 816 are above ground plane 810. In an embodiment, one of signal feeds 815 or 816 is above ground plane 810, while the other signal feed penetrates ground plane 810.

An example composite antenna 800 may be configured as follows:

λ/4 spacing between the two dipole antenna elements, e.g., about 25 mm at 3 GHz.

λ/4 spacing between the first dual dipole antenna element and the ground plane, e.g., about 25 mm at 3 GHz.

32 and 28 ohm input impedance at the two dipole antenna elements, respectively.

Figure 9A:
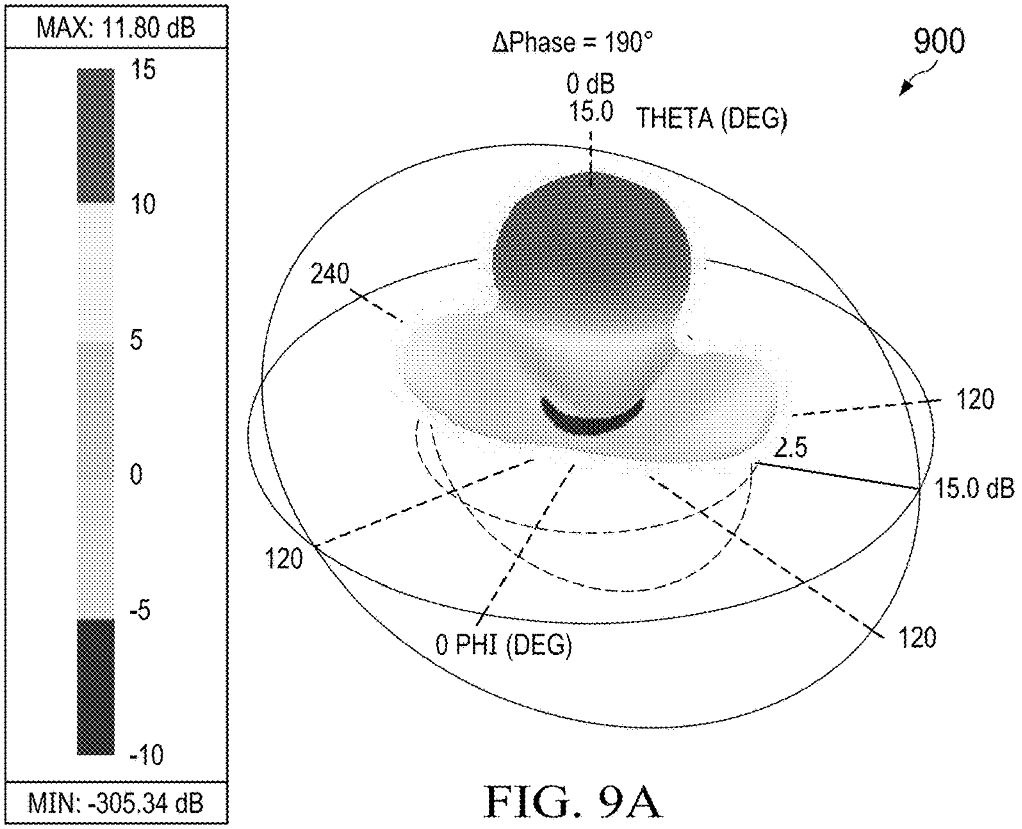
FIGS. 9A-9B illustrate plots of co-polarized directivity or beam pattern of the composite antenna element of FIG. 8 with about 190 and 313 degree relative phase difference between signals according to example embodiments presented herein.
Figure 9B:
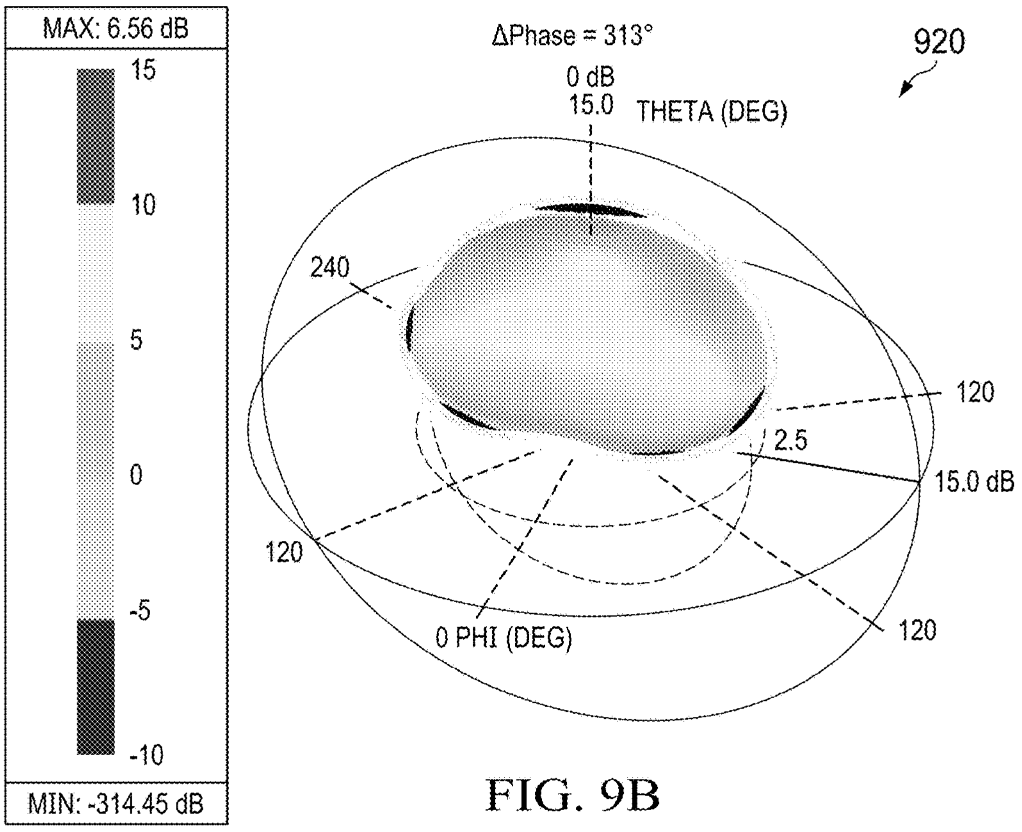

FIG. 9A illustrates a plot 900 of co-polarized directivity or beam pattern of composite antenna 800 with about a 190 degree relative phase difference between signals. Plot 900 displays the co-polarized directivity or beam pattern of composite antenna 800 with about a 190 degree relative phase difference between signals at the two ports. FIG. 9B illustrates a plot 920 of co-polarized directivity or beam pattern of composite antenna 800 with about a 313 degree relative phase difference between signals. Plot 920 displays the co-polarized directivity or beam pattern of composite antenna 800 with about a 313 degree relative phase difference between signals at the two ports. The co-polarized directivity or beam patterns shown in FIGS. 9A and 9B are shown in dB, with different shading representing different dB value ranges. Differences in maximum and minimum values shown in FIGS. 9A and 9B are due to different antenna beams shown in the figures. Comparing plots 900 and 920, the co-polarized directivity or beam pattern becomes wider with less directivity as the relative phase difference increases to about 313 degrees. Actual values are not as important (because different beams are being shown) as the changes in the beam shapes, which show that the directivity or beam pattern becomes less directional as the relative phase difference increases to about 313 degrees.

Figure 9C:
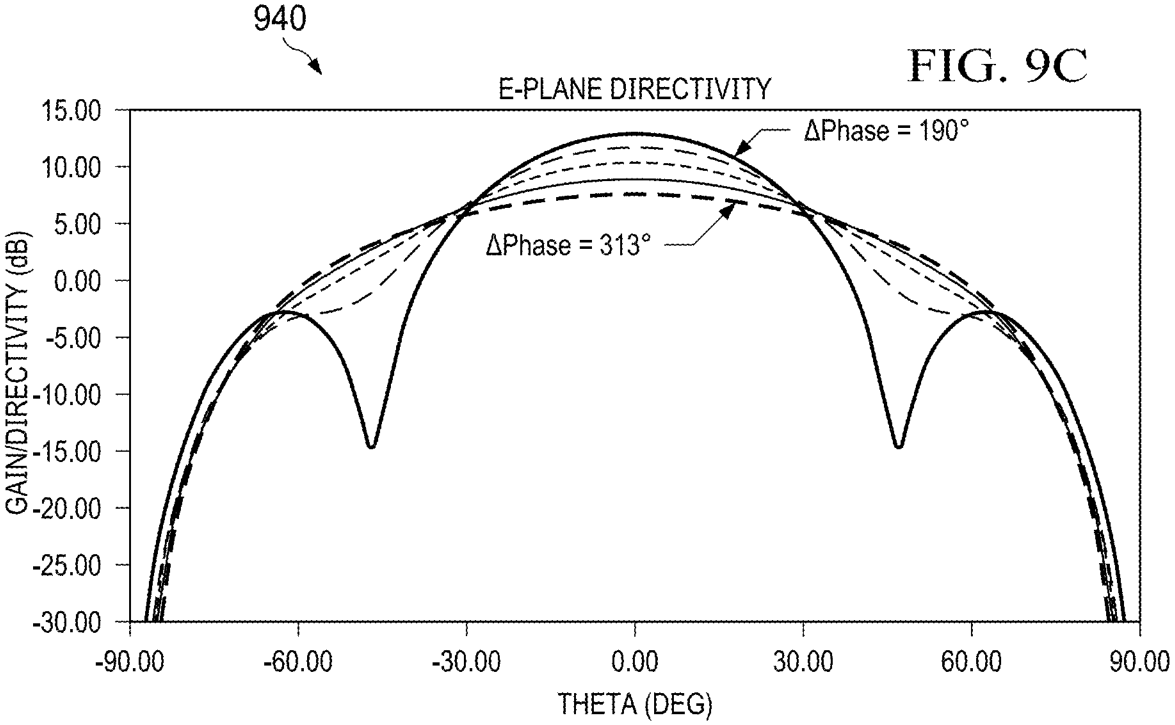
FIGS. 9C-9D illustrate plots of E-plane and H-plane directivity or beam pattern of the composite antenna element of FIG. 8 with different relative phase differences according to example embodiments presented herein.
Figure 9D:
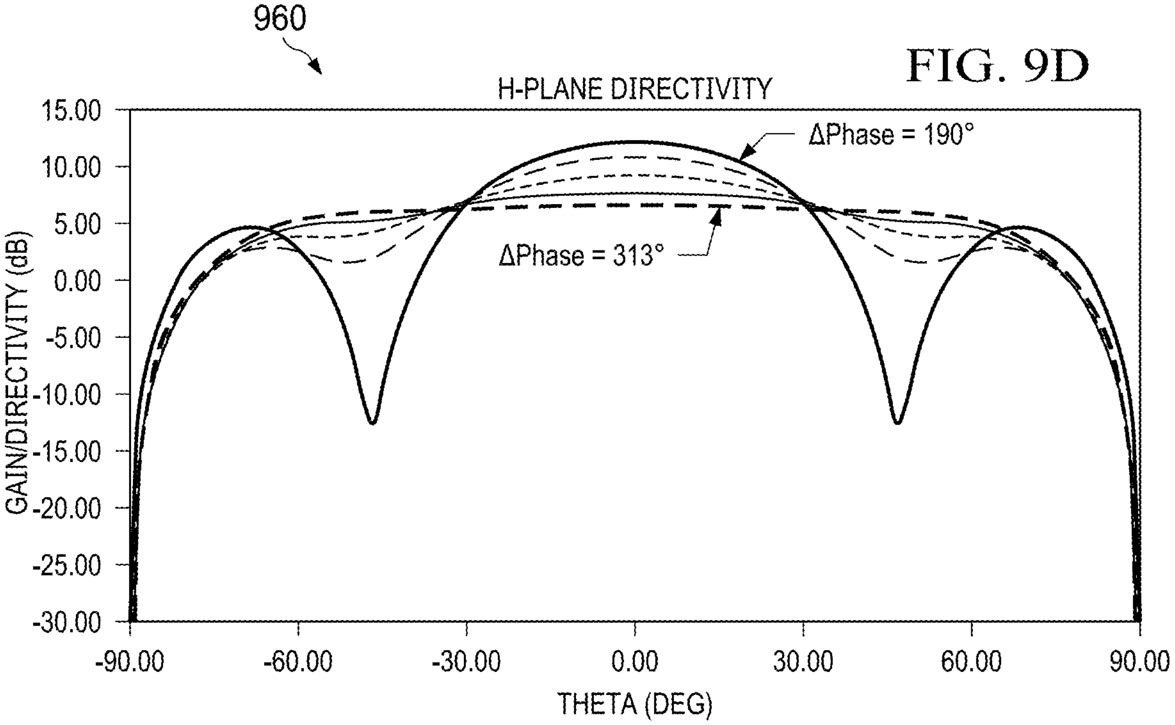

FIG. 9C illustrates a plot 940 of E-plane directivity or beam pattern of composite antenna 800 with different relative phase differences. As shown in FIG. 9C, the E-plane directivity or beam pattern flattens out with fewer and less severe valleys as the relative phase difference increases from about 190 degrees to about 313 degrees. FIG. 9D illustrates a plot 960 of H-plane directivity or beam pattern of composite antenna 800 with different relative phase differences. As shown in FIG. 9D, the H-plane directivity or beam pattern flattens out with fewer and less severe valleys as the relative phase difference increases from about 190 degrees to about 313 degrees. Hence, the co-polarized directivity or beam pattern of composite antenna 800 becomes wider as the relative phase difference approaches about 313 degrees. The flattening of the E-plane and H-plane directivity or beam pattern means that the beams are becoming less directional as the relative phase difference approaches 313 degrees. Therefore, if a less directional beam is desired, a signal with a relative phase difference close to 313 degrees may be fed to composite antenna 800. While, if a more directional beam is desired, a signal with a relative phase difference close to 190 degrees may be fed to composite antenna 800. Hence, it is possible to control the directivity of composite antenna 800 by changing the relative phase difference of the signals fed to composite antenna 800.

In an embodiment, in order to increase the co-polarized directivity or beamwidth of the beam pattern of composite antenna 800, the relative phase difference between the signals is increased to a maximum of about 313 degrees.

According to an example embodiment, a composite antenna element with a patch antenna element and a dipole antenna element is provided. The patch antenna element and the dipole antenna element are fed with separate signals to enable the controlling of the beamwidth and directivity of the beam pattern of the composite antenna element. In an embodiment, a first antenna element comprises a patch antenna element and a second antenna element comprises a dipole antenna element. In an embodiment, the dipole antenna element is shifted parallel to the ground plane relative to the patch antenna element.

Figure 10:
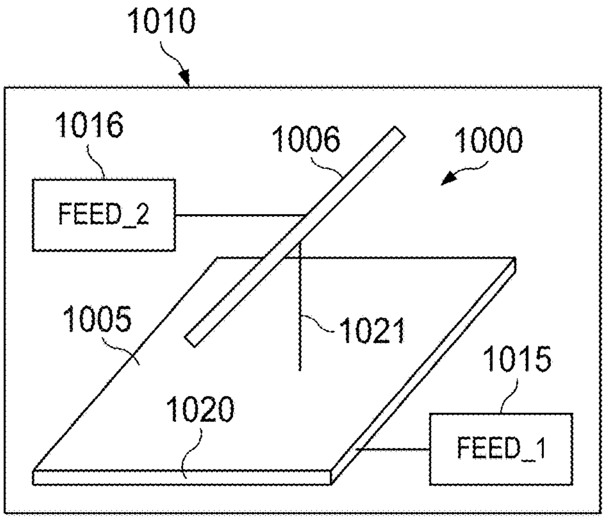
FIG. 10 illustrates a perspective view of a composite antenna element with a patch antenna element and a dipole antenna element according to example embodiments presented herein.

FIG. 10 illustrates a perspective view of a composite antenna 1000 with a patch antenna element and a dipole antenna element. Composite antenna 1000 comprises a patch antenna element 1005 and a dipole antenna element 1006 disposed over a ground plane 1010. Patch antenna element 1005 and dipole antenna element 1006 are fed by signal feeds 1015 and 1016, respectively. Support 1020 keeps patch antenna element separate from ground plane 1010. Support 1020 may be a dielectric layer or some other form of support. Support 1021 keeps dipole antenna element 1006 from patch antenna element 1005. Supports 1020 and 1021 also help to maintain the relative position and orientation of the antenna elements. In an embodiment, signal feeds 1015 and 1016 may penetrate ground plane 1010. In an embodiment, signal feeds 1015 and 1016 are above ground plane 1010. In an embodiment, one of signal feeds 1015 or 1016 is above ground plane 1010, while the other signal feed penetrates ground plane 1010.

An example composite antenna 1000 may be configured as follows:

- $\lambda/4$ spacing between the patch antenna element and the dipole antenna element, e.g., about 25 mm at 3 GHz.
- $\lambda/4$ spacing between the patch antenna element and the ground plane, e.g., about 25 mm at 3 GHz.
- 68.2 and 23.5 ohm input impedance at the two antenna elements, respectively.

Figure 11A:
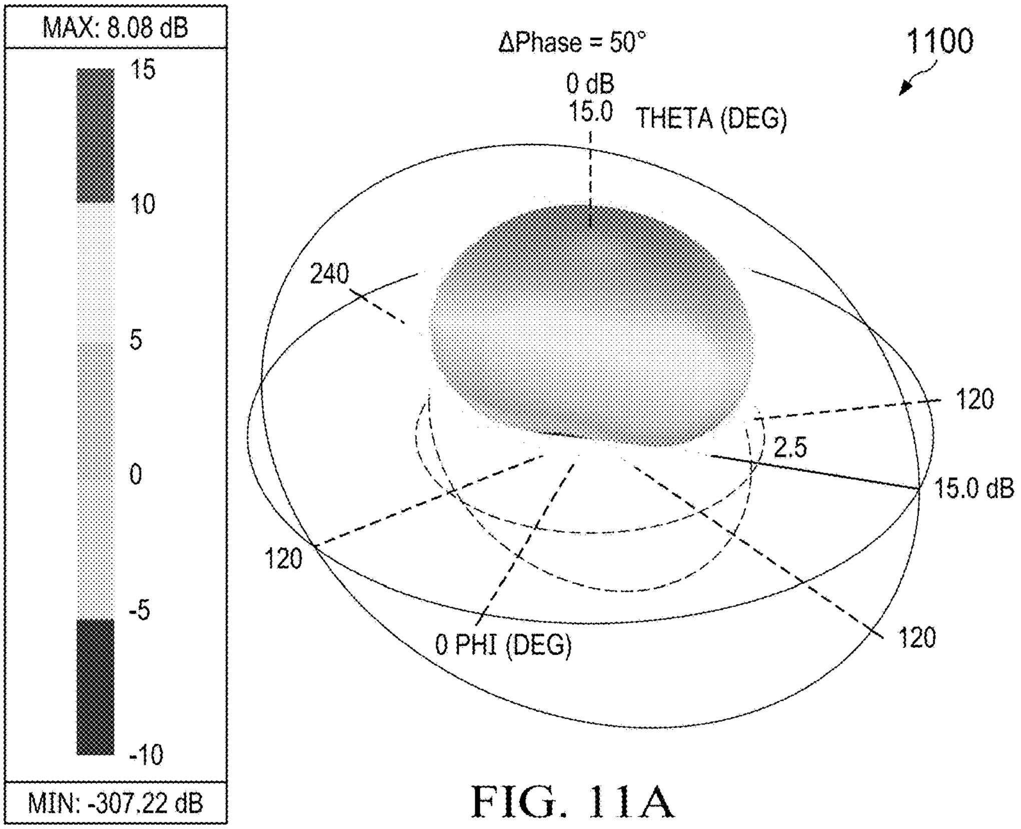
FIGS. 11A-11B illustrate plots of co-polarized directivity or beam pattern of the composite antenna element of FIG. 10 with about 50 and 210 degree relative phase difference between signals according to example embodiments presented herein.
Figure 11B:
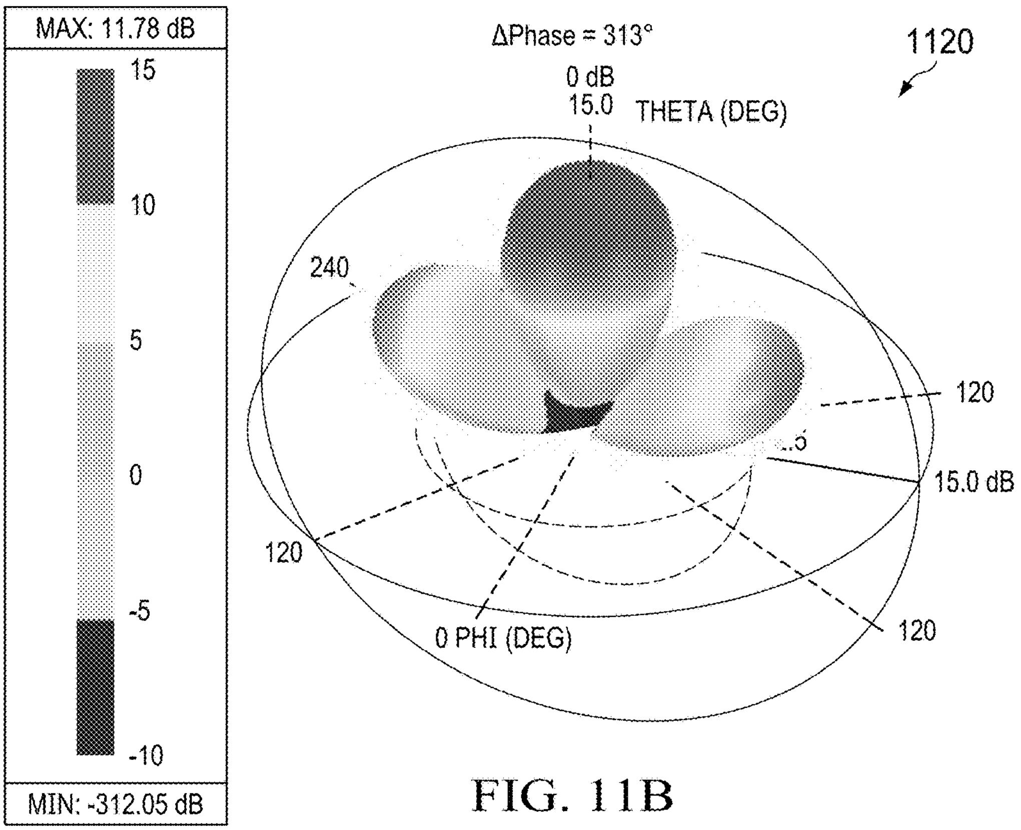

FIG. 11A illustrates a plot 1100 of co-polarized directivity or beam pattern of composite antenna 1000 with about a 50 degree relative phase difference between signals. Plot 1100 displays the co-polarized directivity or beam pattern of composite antenna 1000 with about a 50 degree relative phase difference between signals at the two ports. FIG. 11B illustrates a plot 1120 of co-polarized directivity or beam pattern of composite antenna 1000 with about a 210 degree relative phase difference between signals. Plot 1120 displays the co-polarized directivity or beam pattern of composite antenna 1000 with about a 210 degree relative phase difference between signals at the two ports. The co-polarized directivity or beam patterns shown in FIGS. 11A and 11B are shown in dB, with different shading representing different dB value ranges. Differences in maximum and minimum values shown in FIGS. 11A and 11B are due to different antenna beams shown in the figures. Comparing plots 1100 and 1120, the co-polarized directivity or beam pattern becomes narrower with greater directivity as the relative phase difference increases to about 210 degrees. Actual values are not as important (because different beams are being shown) as the changes in the beam shapes, which show that the directivity or beam pattern becomes less directional as the relative phase difference increases to about 210 degrees.

Figure 11C:
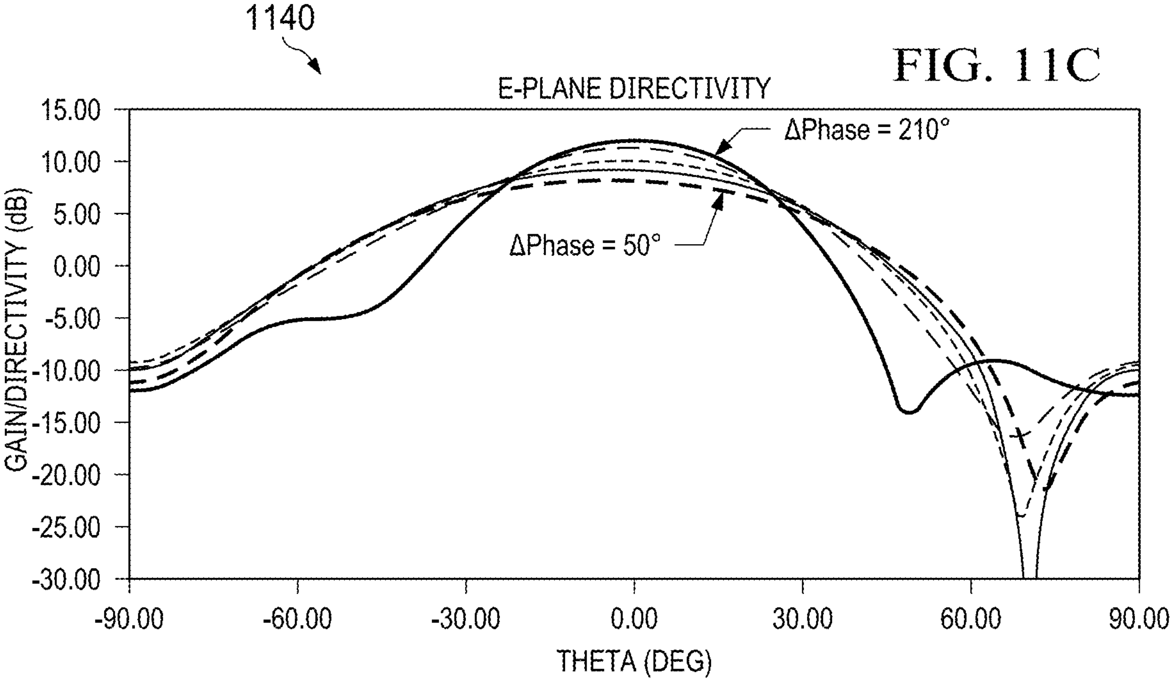
FIGS. 11C-11D illustrate plots of E-plane and H-plane directivity or beam pattern of the composite antenna element of FIG. 10 with different relative phase differences according to example embodiments presented herein.
Figure 11D:
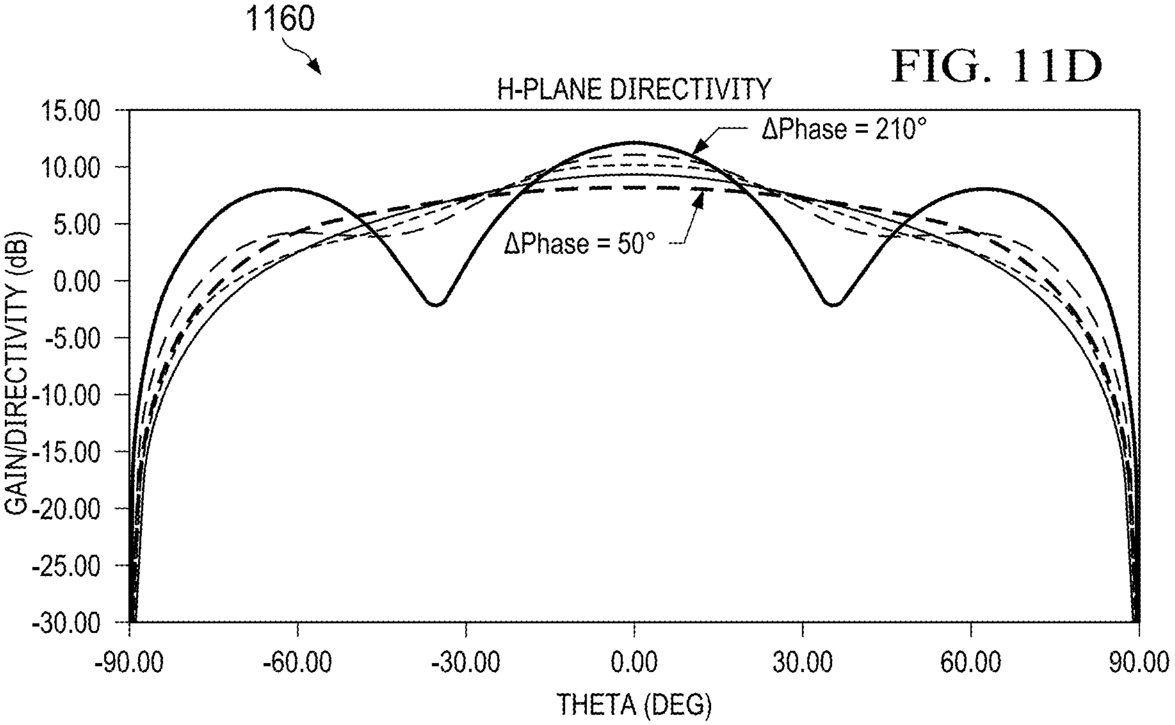

FIG. 11C illustrates a plot 1140 of E-plane directivity or beam pattern of composite antenna 1000 with different relative phase differences. As shown in FIG. 11C, the E-plane directivity or beam pattern peaks with more severe valleys as the relative phase difference increases from about 50 degrees to 210 degrees. FIG. 11D illustrates a plot 1160 of H-plane directivity or beam pattern of composite antenna 1000 with different relative phase differences. As shown in FIG. 11D, the H-plane directivity or beam pattern peaks with more severe valleys as the relative phase difference increases from about 50 degrees to about 210 degrees. Hence, the co-polarized directivity or beam pattern of composite antenna 1000 becomes narrower as the relative phase difference approaches about 210 degrees. The flattening of the E-plane and H-plane directivity or beam pattern means that the beams are becoming less directional as the relative phase difference approaches 210 degrees. Therefore, if a less directional beam is desired, a signal with a relative phase difference close to 210 degrees may be fed to composite antenna 1000. While, if a more directional beam is desired, a signal with a relative phase difference close to 50 degrees may be fed to composite antenna 1000. Hence, it is possible to control the directivity of composite antenna 1000 by changing the relative phase difference of the signals fed to composite antenna 1000.

In an embodiment, in order to decrease the co-polarized directivity or beamwidth of the beam pattern of composite antenna 1000, the relative phase difference between the signals is increased to a maximum of about 210 degrees.

According to an example embodiment, the beamwidth of the beam pattern of the composite antenna is dynamically controllable by adjusting weighting factors of the feed signals provided to the antenna elements. The weighting factors may be adjusted to change the relative phase, relative magnitude, or relative phase and magnitude of the feed signals provided to the antenna elements.

Figure 12:
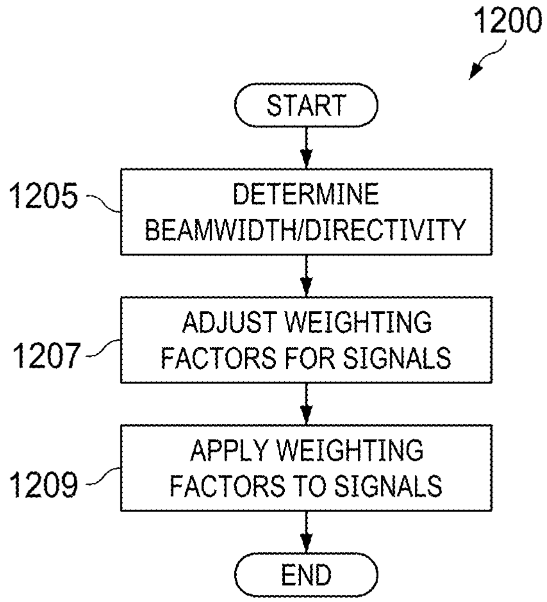
FIG. 12 illustrates a flow diagram of example operations occurring in a communicating device dynamically controlling the beamwidth of the beam pattern of a composite antenna element according to example embodiments presented herein.

FIG. 12 illustrates a flow diagram of example operations 1200 occurring in a communicating device dynamically controlling the beamwidth of the beam pattern of a composite antenna. Operations 1200 may be indicative of operations occurring in a communicating device as the communicating device controls the beamwidth of the beam pattern of a composite antenna.

Operations 1200 begin with the communicating device determining a beamwidth or directivity of the beam pattern of a composite antenna (block 1205). The beamwidth or directivity of the beam pattern may be dependent upon coverage requirements, such as urban or rural deployment, low-density or high-density coverage, and so on. The communicating device adjusts the weighting factors for signals used to feed the composite antenna (block 1207). The weighting factors may be adjusted for the signals used to feed the individual antenna elements of the composite antenna. As an example, the weighting factors are adjusted to that a relative phase difference between the signals meet a desired relative phase difference so that the composite antenna will produce beam patterns with the intended beamwidth or directivity. As an example, the weighting factors are adjusted so that a relative magnitude difference between the signals meet a desired relative magnitude difference so that the composite antenna will produce beam patterns with the intended beamwidth or directivity. As another example, the weighting factors are adjusted so that a relative phase difference and a relative magnitude difference between the signals meet a desired relative phase difference so that the composite antenna will produce beam patterns with the intended beamwidth or directivity. The communicating device applies the weighting factors to the signals (block 1209). As an example, the communicating device may multiply the signals with the weighting factors. The communicating device may apply the weighting factors to analog circuitry to adjust the signals in the analog domain, for example.

Figure 13A:
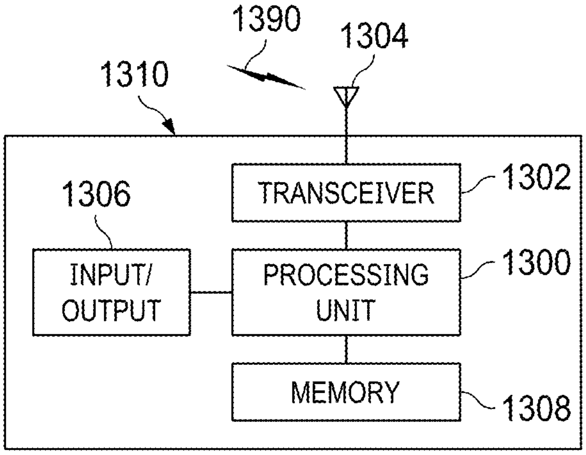
FIGS. 13A and 13B illustrate example devices that may implement the methods and teachings according to this disclosure.
Figure 13B:
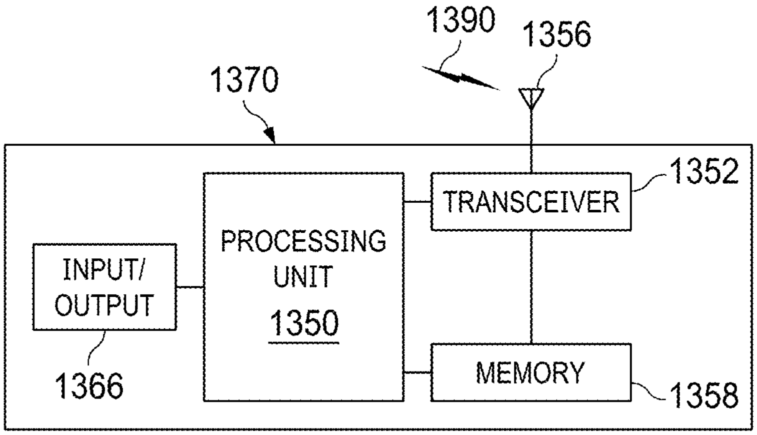

FIGS. 13A and 13B illustrate example devices that may implement the methods and teachings according to this disclosure. In particular, FIG. 13A illustrates an example electronic device (ED) 1310, and FIG. 13B illustrates an example base station 1370. These components could be used in a system.

As shown in FIG. 13A, the ED 1310 includes at least one processing unit 1300. The processing unit 1300 implements various processing operations of the ED 1310. For example, the processing unit 1300 could perform signal coding, data processing, power control, input/output processing, or any other functionality enabling the ED 1310 to operate in the system. The processing unit 1300 also supports the methods and teachings described in more detail above. Each processing unit 1300 includes any suitable processing or computing device configured to perform one or more operations. Each processing unit 1300 could, for example, include a microprocessor, microcontroller, digital signal processor, field programmable gate array, or application specific integrated circuit.

The ED 1310 also includes at least one transceiver 1302. The transceiver 1302 is configured to modulate data or other content for transmission by at least one antenna or NIC (Network Interface Controller) 1304. The at least one antenna 1304 may be a composite antenna with parallel antenna elements that are separately fed, as described herein. The transceiver 1302 is also configured to demodulate data or other content received by the at least one antenna 1304. Each transceiver 1302 includes any suitable structure for generating signals for wireless or wired transmission or processing signals received wirelessly or by wire. Each antenna 1304 includes any suitable structure for transmitting or receiving wireless or wired signals. One or multiple transceivers 1302 could be used in the ED 1310, and one or multiple antennas 1304 could be used in the ED 1310. Although shown as a single functional unit, a transceiver 1302 could also be implemented using at least one transmitter and at least one separate receiver.

The ED 1310 further includes one or more input/output devices 1306 or interfaces (such as a wired interface to the Internet). The input/output devices 1306 facilitate interaction with a user or other devices (network communications) in the network. Each input/output device 1306 includes any suitable structure for providing information to or receiving information from a user, such as a speaker, microphone, keypad, keyboard, display, or touch screen, including network interface communications.

In addition, the ED 1310 includes at least one memory 1308. The memory 1308 stores instructions and data used, generated, or collected by the ED 1310. For example, the memory 1308 could store software or firmware instructions executed by the processing unit(s) 1300 and data used to reduce or eliminate interference in incoming signals. Each memory 1308 includes any suitable volatile or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 13B, the base station 1370 includes at least one processing unit 1350, at least one transceiver 1352, which includes functionality for a transmitter and a receiver, one or more antennas 1356, at least one memory 1358, and one or more input/output devices or interfaces 1366. The at least one antenna 1356 may be a composite antenna element with parallel antenna elements that are separately fed, as described herein. A scheduler, which would be understood by one skilled in the art, is coupled to the processing unit 1350. The scheduler could be included within or operated separately from the base station 1370. The processing unit 1350 implements various processing operations of the base station 1370, such as signal coding, data processing, power control, input/output processing, or any other functionality. The processing unit 1350 can also support the methods and teachings described in more detail above. Each processing unit 1350 includes any suitable processing or computing device configured to perform one or more operations. Each processing unit 1350 could, for example, include a microprocessor, microcontroller, digital signal processor, field programmable gate array, or application specific integrated circuit.

Each transceiver 1352 includes any suitable structure for generating signals for wireless or wired transmission to one or more EDs or other devices. Each transceiver 1352 further includes any suitable structure for processing signals received wirelessly or by wire from one or more EDs or other devices. Although shown combined as a transceiver 1352, a transmitter and a receiver could be separate components. Each antenna 1356 includes any suitable structure for transmitting or receiving wireless or wired signals. While a common antenna 1356 is shown here as being coupled to the transceiver 1352, one or more antennas 1356 could be coupled to the transceiver(s) 1352, allowing separate antennas 1356 to be coupled to the transmitter and the receiver if equipped as separate components. Each memory 1358 includes any suitable volatile or non-volatile storage and retrieval device(s). Each input/output device 1366 facilitates interaction with a user or other devices (network communications) in the network. Each input/output device 1366 includes any suitable structure for providing information to or receiving/providing information from a user, including network interface communications.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a determining unit or module, an adjusting unit or module, an applying unit or module, or a multiplying unit or module. The respective units or modules may be hardware, software, or a combination thereof. For instance, one or more of the units or modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the scope of the disclosure as defined by the appended claims.

What is claimed is:

1. A composite antenna comprising:

a first antenna element disposed above a ground plane, the first antenna element being operatively coupled to a first signal feed providing a first signal, the first antenna element being configured to radiate the first signal provided by the first signal feed; and a second antenna element disposed above the first antenna element, the second antenna element being operatively coupled to a second signal feed providing a second signal, the second antenna element being configured to radiate the second signal provided by the second signal feed, the first signal and the second signal being adjusted to set a beamwidth and a directivity of a beam pattern of a combined beam radiated by the composite antenna, the first signal feed and the second signal feed being separate signal feeds.

2. The composite antenna of claim 1, the first antenna element comprising a first dual-polarized bowtie antenna arranged in a first plane parallel to the ground plane, and the second antenna element comprising a second dual-polarized bowtie antenna arranged in a second plane parallel to the ground plane, the first plane being positioned between the second plane and the ground plane.

3. The composite antenna of claim 2, the first antenna element being coupled to the first signal feed by a first signal feed path, the first signal feed path comprising:

a first support structure comprising two support members, each support member supporting a bowtie antenna of the first dual-polarized bowtie antenna;

a first electrical conductor disposed within a first support member of the first support structure, the first electrical conductor being electrically coupled to a first bowtie antenna of the first dual-polarized bowtie antenna and the first signal feed and configured to provide the first signal at a first polarity to the first bowtie antenna; and a second electrical conductor disposed within a second support member of the first support structure and being coupled to a second bowtie antenna of the first dual-polarized bowtie antenna and the first signal feed, the second electrical conductor being configured to provide the first signal at a second polarity to the second bowtie antenna.

4. The composite antenna of claim 3, the second antenna element being coupled to the second signal feed by a second signal feed path, the second signal feed path comprising:

a second support structure comprising a plurality of second support members, each support member of the plurality of second support members supporting a corresponding bowtie antenna of the second dual-polarized bowtie antenna;

a third electrical conductor disposed within a third support member of the second support structure, the third electrical conductor being electrically coupled to a first bowtie antenna of the second dual-polarized bowtie antenna and the second signal feed, the third electrical conductor being configured to provide the second signal at a first polarity to the first bowtie antenna of the second dual-polarized bowtie antenna; and a fourth electrical conductor disposed within a fourth support member of the second support structure, the fourth electrical conductor being electrically coupled to a second bowtie antenna of the second dual-polarized bowtie antenna and to the second signal feed, the fourth electrical conductor being configured to provide the second signal at a second polarity to the second bowtie antenna of the second dual-polarized bowtie antenna.

5. The composite antenna of claim 4, further comprising:

an element configured to reinforce the first support structure and the second support structure and to electrically couple the first support structure and the second support structure.

6. The composite antenna of claim 1, the first antenna element comprising a first dipole antenna arranged in a first plane parallel to the ground plane, and the second antenna element comprising a second dipole antenna arranged in a second plane parallel to the ground plane.

7. The composite antenna of claim 6, the first antenna element being coupled to the first signal feed by a first signal feed path, the first signal feed path comprising a first electrical conductor electrically coupled to the first dipole antenna, and the second antenna element being coupled to the second signal feed by a second signal feed path, the second signal feed path comprising a second electrical conductor electrically coupled to the second dipole antenna.

8. The composite antenna of claim 6, the first dipole antenna and the second dipole antenna having a same orientation.

9. The composite antenna of claim 6, the first dipole antenna and the second dipole antenna having an offset of less than or equal to $\lambda/4$, where $\lambda$ is a wavelength of an intended operating frequency of the composite antenna.

10. The composite antenna of claim 1, the first antenna element being coupled to the first signal feed by a first signal feed path, the first antenna element comprising a first bowtie antenna arranged in a first plane parallel to the ground plane, and the second antenna element being coupled to the second signal feed by a second signal feed path, the second antenna element comprising a second bowtie antenna arranged in a second plane parallel to the ground plane.

11. The composite antenna of claim 10, the first signal feed path comprising a first electrical conductor electrically coupled to the first bowtie antenna, and the second signal feed path comprising a second electrical conductor electrically coupled to the second bowtie antenna.

12. The composite antenna of claim 1, the first antenna element comprising a patch antenna arranged in a first plane parallel to the ground plane, and the second antenna element comprising a dipole antenna arranged in a second plane parallel to the ground plane.

13. The composite antenna of claim 12, the first antenna element being coupled to the first signal feed by a first signal feed path, the first signal feed path comprising a first electrical conductor electrically coupled to the patch antenna, and the second antenna element being coupled to the second signal feed by a second signal feed path, the second signal feed path comprising a second electrical conductor electrically coupled to the dipole antenna.

14. The composite antenna of claim 1, further comprising:

an insulative layer disposed between the first antenna element and the second antenna element.

15. The composite antenna of claim 1, the first signal and the second signal being adjusted to a specified phase difference between the first signal and the second signal.

16. The composite antenna of claim 15, the first signal and the second signal being further adjusted to a specified magnitude difference between the first signal and the second signal.

17. The composite antenna of claim 1, the first antenna element and the second antenna element having an offset of less than or equal to $\lambda/4$, where $\lambda$ is a wavelength of an intended operating frequency of the composite antenna.

18. An antenna array comprising an array of one or more composite antennas, each composite antenna comprising:

a first antenna element disposed above a ground plane, the first antenna element being operatively coupled to a first signal feed providing a first signal, the first antenna element being configured to radiate the first signal provided by the first signal feed; and a second antenna element disposed above the first antenna element, the second antenna element being operatively coupled to a second signal feed providing a second signal, the second antenna element being configured to radiate the second signal provided by the second signal feed, the first signal and the second signal being adjusted to set a beamwidth and a directivity of a beam pattern of a combined beam radiated by each composite antenna, the first signal feed and the second signal feed being separate signal feeds.

19. The antenna array of claim 18, the first antenna element comprising a first dual-polarized bowtie antenna arranged in a first plane parallel to the ground plane, and the second antenna element comprising a second dual-polarized bowtie antenna arranged in a second plane parallel to the ground plane, the first plane being positioned between the second plane and the ground plane.

20. The antenna array of claim 19, the first antenna element being coupled to the first signal feed by a first signal feed path, the first signal feed path comprising:

a first support structure comprising two support members, with each support member supporting a bowtie antenna of the first dual-polarized bowtie antenna;

a first electrical conductor disposed within a first support member of the first support structure, the first electrical conductor electrically coupled to a first bowtie antenna of the first dual-polarized bowtie antenna and the first signal feed, the first electrical conductor configured to provide the first signal at a first polarity to the first bowtie antenna; and a second electrical conductor disposed within a second support member of the first support structure, the second electrical conductor coupled to a second bowtie antenna of the first dual-polarized bowtie antenna and the first signal feed, the second electrical conductor configured to provide the first signal at a second polarity to the second bowtie antenna.

21. The antenna array of claim 20, the second antenna element being coupled to the second signal feed by a second signal feed path, the second signal feed path comprising:

a second support structure comprising a plurality of second support members, each support member of the plurality of second support members supporting a corresponding bowtie antenna of the second dual-polarized bowtie antenna;

a third electrical conductor disposed within a third support member of the second support structure, the third electrical conductor being electrically coupled to a first bowtie antenna of the second dual-polarized bowtie antenna and the second signal feed, the third electrical conductor being configured to provide the second signal at a first polarity to the first bowtie antenna of the second dual-polarized bowtie antenna; and a fourth electrical conductor disposed within a fourth support member of the second support structure, the fourth electrical conductor being electrically coupled to a second bowtie antenna of the second dual-polarized bowtie antenna and the second signal feed, the fourth electrical conductor being configured to provide the second signal at a second polarity to the second bowtie antenna of the second dual-polarized bowtie antenna.

22. The antenna array of claim 21, each composite antenna further comprising:

an element configured to reinforce the first support structure and the second support structure, and electrically couple the first support structure and the second support structure.

23. The antenna array of claim 18, the first antenna element comprising a first dipole antenna arranged in a first plane parallel to the ground plane, and the second antenna element comprising a second dipole antenna arranged in a second plane parallel to the ground plane.

24. The antenna array of claim 23, the first antenna element being coupled to the first signal feed by a first signal feed path comprising a first electrical conductor electrically coupled to the first dipole antenna, the second antenna element being coupled to the second signal feed by a second signal feed path comprising a second electrical conductor electrically coupled to the second dipole antenna.

25. The antenna array of claim 23, the first dipole antenna and the second dipole antenna having a common orientation.

26. The antenna array of claim 23, the first dipole antenna and the second dipole antenna having an offset of less than or equal to $\lambda/4$, where $\lambda$ is a wavelength of an operating frequency of each composite antenna.

27. The antenna array of claim 18, the first antenna element being coupled to the first signal feed by a first signal feed path, the first antenna element comprising a first bowtie antenna arranged in a first plane parallel to the ground plane, and the second antenna element being coupled to the second signal feed by a second signal feed path, the second antenna element comprising a second bowtie antenna arranged in a second plane parallel to the ground plane.

28. The antenna array of claim 27, the first signal feed path comprising a first electrical conductor electrically coupled to the first bowtie antenna, and the second signal feed path comprising a second electrical conductor electrically coupled to the second bowtie antenna.

29. The antenna array of claim 18, the first antenna element comprising a patch antenna arranged in a first plane parallel to the ground plane, and the second antenna element comprising a dipole antenna arranged in a second plane parallel to the ground plane.

30. The antenna array of claim 29, the first antenna element being coupled to the first signal feed by a first signal feed path, the first signal feed path comprising a first electrical conductor electrically coupled to the patch antenna, and the second antenna element being coupled to the second signal feed by a second signal feed path, the second signal feed path comprising a second electrical conductor electrically coupled to the dipole antenna.

31. The antenna array of claim 18, each composite antenna further comprising:

an insulative layer disposed between the first antenna element and the second antenna element.

32. The antenna array of claim 18, the first signal and the second signal being adjusted to a specified phase difference between the first signal and the second signal.

33. The antenna array of claim 32, the first signal and the second signal being further adjusted to a specified magnitude difference between the first signal and the second signal.

* * * * *